US012715733B2

(12) United States Patent
Chen et al.

(10) Patent No.: US 12,715,733 B2
(45) Date of Patent: Aug. 25, 2026

(54) ELEVATOR POSITIONING SYSTEM AND METHOD OF USING THE SAME

(71) Applicant: HONEYWELL INTERNATIONAL INC., Charlotte, NC (US)

(72) Inventors: Enyi Chen, Charlotte, NC (US); Yu Hu, Charlotte, NC (US); Yang Lu, Charlotte, NC (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 1154 days.

(21) Appl. No.: 17/449,745

(22) Filed: Oct. 1, 2021

(65) Prior Publication Data

US 2022/0306427 A1 Sep. 29, 2022

(30) Foreign Application Priority Data

Mar. 23, 2021 (CN) ......................... 202110305685.0

(51) Int. Cl.
*B66B 1/34* (2006.01)
*B66B 1/24* (2006.01)

(52) U.S. Cl.
CPC .............. *B66B 1/3492* (2013.01); *B66B 1/24* (2013.01); *B66B 1/3461* (2013.01)

(58) Field of Classification Search
CPC ....... B66B 1/3492; B66B 1/24; B66B 1/3461; B66B 5/0018
See application file for complete search history.

(56) References Cited

U.S. PATENT DOCUMENTS 3,098,992 A * 7/1963 Rath ..................... B66B 1/3492 187/394
6,554,107 B2 * 4/2003 Yumura ................ B66B 1/3415 187/394

(Continued)

FOREIGN PATENT DOCUMENTS

CN 1410335 A 4/2003
CN 101844719 A 9/2010

(Continued)

OTHER PUBLICATIONS

European search report Mailed on May 24, 2022 for EP Application No. 21200822.

(Continued)

*Primary Examiner* — Lawrence Averick
(74) *Attorney, Agent, or Firm* — Alston & Bird LLP

(57) ABSTRACT

Various embodiments are directed to an elevator positioning system, comprising: a transceiver disposed within an elevator shaft; a first positioning element; a second positioning element; and a controller communicably coupled to the transceiver, wherein the controller is configured to: determine a first distance between the transceiver and the first positioning element; determine a calibration distance between the transceiver and the second positioning element based at least in part on a second reflection detected by the transceiver from the second positioning element at a first instance; based at least in part on the first distance and the calibration distance, calculate an adjusted elevator car position defined at least in part by a shaft displacement compensation distance; and cause an elevator car to move about a vertical axis of the elevator shaft to a vertical position within the elevator shaft that corresponds at least in part to the adjusted elevator car position.

9 Claims, 11 Drawing Sheets

(56) References Cited

U.S. PATENT DOCUMENTS

| | | | | |
|---|---|---|---|---|
| 6,659,232 | B2 | 12/2003 | Oelschlegel | |
| 8,020,271 | B2 * | 9/2011 | Baum | E04G 11/22 29/709 |
| 10,106,323 | B2 * | 10/2018 | Terrill | B62B 3/06 |
| 10,266,369 | B2 * | 4/2019 | Sonnenmoser | B66B 1/3461 |
| 10,371,531 | B2 * | 8/2019 | Salmikuukka | G05B 15/02 |
| 10,399,774 | B2 * | 9/2019 | Ramankutty | B65G 1/0414 |
| 10,618,731 | B2 * | 4/2020 | Ramankutty | B65G 1/0492 |
| 10,689,226 | B2 * | 6/2020 | Depaola, Jr. | B66B 9/02 |
| 10,787,340 | B2 * | 9/2020 | Ginsberg | B66B 1/3492 |
| 2003/0006101 | A1 | 1/2003 | Christian | |
| 2003/0057030 | A1 * | 3/2003 | Yumura | B66B 1/3423 187/394 |
| 2009/0041879 | A1 * | 2/2009 | Baum | E04G 11/28 33/286 |
| 2016/0313127 | A1 * | 10/2016 | Salmikuukka | G01C 21/206 |
| 2016/0368710 | A1 * | 12/2016 | Ramankutty | B65G 1/0421 |
| 2017/0008701 | A1 * | 1/2017 | Terrill | B65G 1/0492 |
| 2017/0081121 | A1 * | 3/2017 | Ramankutty | B65G 1/0492 |
| 2017/0217725 | A1 * | 8/2017 | Sonnenmoser | B66B 1/462 |
| 2017/0355555 | A1 * | 12/2017 | Ginsberg | B66B 1/40 |
| 2018/0009630 | A1 * | 1/2018 | Depaola, Jr. | B66B 9/02 |
| 2018/0252535 | A1 * | 9/2018 | Bhimavarapu | A61G 1/0281 |
| 2024/0285454 | A1 * | 8/2024 | Paul | A61G 7/165 |

FOREIGN PATENT DOCUMENTS

| | | | |
|---|---|---|---|
| CN | 110092253 | A | 8/2019 |
| CN | 110803590 | A | 2/2020 |
| DE | 10133171 | C1 | 12/2002 |
| DE | 102017129822 | A1 | 6/2019 |

OTHER PUBLICATIONS

EP Office Action Mailed on Mar. 5, 2024 for EP Application No. 21200822, 5 page(s).

CN Office Action, including Search Report Mailed on Mar. 13, 2026 for CN Application No. 202110305685, 8 page(s).

English Translation of CN Office Action dated Mar. 13, 2026 for CN Application No. 202110305685, 8 page(s).

EP Office Action Mailed on Nov. 11, 2025 for EP Application No. 21200822, 5 page(s).

EP Office Action Mailed on Jun. 5, 2026 for EP Application No. 21200822, 10 page(s).

* cited by examiner

ELEVATOR POSITIONING SYSTEM AND METHOD OF USING THE SAME

CROSS-REFERENCE TO RELATED APPLICATIONS

This application claims priority pursuant to 35 U.S.C. 119(a) to China Patent Application No. 202110305685.0, filed Mar. 23, 2021, which application is incorporated herein by reference in its entirety.

FIELD OF THE INVENTION

Various embodiments described herein relate generally to measurement systems used in conjunction with an elevator system, and, more particularly, to a measurement system used for maintaining an alignment condition between an elevator car and one or more external environments by compensating for the expansion and/or compression of a building and reducing signal interference caused by multipath reflection within an elevator shaft.

BACKGROUND

Industrial and commercial applications may use elevator systems to facilitate the transport of people, cargo, and/or the throughout various levels of a multi-story building. In particular, an elevator positioning system may be used to monitor the relative position (e.g., the relative height) of an elevator car within an elevator shaft, such that the elevator car may move between one or more desired locations along the elevator shaft. Through applied effort, ingenuity, and innovation, Applicant has solved problems relating to elevator positioning systems by developing solutions embodied in the present disclosure, which are described in detail below.

BRIEF SUMMARY

Various embodiments described herein relate to elevator positioning systems and methods for using the same. Various embodiments are directed to an elevator positioning system, comprising: a transceiver disposed within an elevator shaft; a first positioning element; a second positioning element; and a controller communicably coupled to the transceiver, wherein the controller is configured to: determine a first distance between the transceiver and the first positioning element; determine a calibration distance between the transceiver and the second positioning element based at least in part on a second reflection detected by the transceiver from the second positioning element at a first instance; based at least in part on the first distance and the calibration distance, calculate an adjusted elevator car position defined at least in part by a shaft displacement compensation distance; and cause an elevator car to move about a vertical axis of the elevator shaft to a vertical position within the elevator shaft that corresponds at least in part to the adjusted elevator car position.

In various embodiments, calculating an adjusted elevator car position may comprise determining the shaft displacement compensation distance based at least in part on an initial distance between the transceiver and the second positioning element at an initial installation instance. In certain embodiments, determining the shaft displacement compensation distance may comprise deriving a linear relationship to characterize a vertical displacement at a vertical portion of the elevator shaft at a runtime instance, wherein the linear relationship is based at least in part on the initial distance between the transceiver and the second positioning element at the initial installation instance.

In various embodiments, the second positioning element may comprise a structural frame element disposed within the elevator shaft. In various embodiments, the elevator positioning system may further comprise a third positioning element arranged within the elevator shaft such that a third signal emitted from the transceiver engages the third positioning element; and wherein the third positioning element is positioned at a distance away from the second positioning element in the vertical direction. In various embodiments, the controller may be further configured to determine a second calibration distance between the transceiver and the third positioning element based at least in part on a third reflection detected by the transceiver from the third positioning element at the first instance, the third reflection corresponding to at least a portion of the third emitted signal reflected by the third positioning element.

In various embodiments, the elevator positioning system may further comprise a switch position element disposed within the elevator shaft and configured to transmit a trigger signal to the controller based at least in part on a vertical position of the elevator car within the elevator shaft. In various embodiments, the first positioning element may comprise a reflector element comprising a reflector plate defined at least in part by one or more orifices extending through a reflecting face such that at least a portion of a first signal emitted from the transceiver passes through the one or more orifices. In various embodiments, a first signal emitted from the transceiver engages the first positioning element, the first positioning element being arranged relative to the transceiver such that a distance between the first positioning element and the transceiver varies as an elevator car moves along the vertical axis; wherein a second signal emitted from the transceiver engages the second positioning element; wherein the first distance is based at least in part on the transceiver detecting a first reflection from the first positioning element at the first instance, the first reflection corresponding to at least a portion of the first emitted signal reflected by the first positioning element; and wherein the second reflection corresponds to at least a portion of the second emitted signal reflected by the second positioning element.

Various embodiments are directed to a method for controlling an elevator positioning system comprising: determining a first distance between a transceiver and a first positioning element arranged within an elevator shaft based at least in part on a first reflection detected by the transceiver from the first positioning element at a first instance, the first reflection corresponding to at least a portion of a first emitted signal from the transceiver reflected by the first positioning element; determining a calibration distance between the transceiver and a second positioning element based at least in part on a second reflection detected by the transceiver from the second positioning element at the first instance, the second reflection corresponding to at least a portion of a second emitted signal from the transceiver reflected by the second positioning element; based at least in part on the first distance and the calibration distance, calculating an adjusted elevator car position defined at least in part by a shaft displacement compensation distance; causing an elevator car to move about a vertical axis of the elevator shaft to a vertical position within the elevator shaft that corresponds at least in part to the adjusted elevator car position.

In various embodiments, calculating an adjusted elevator car position may comprise determining the shaft displacement compensation distance based at least in part on an initial distance between the transceiver and the second positioning element at an initial installation instance. In various embodiments, determining the shaft displacement compensation distance may comprises deriving a linear relationship to characterize a vertical displacement at a vertical portion of the elevator shaft at a runtime instance, wherein the linear relationship is based at least in part on the initial distance between the transceiver and the second positioning element at the initial installation instance. In various embodiments, the method may further comprise determining a second calibration distance between the transceiver and a third positioning element based at least in part on a third reflection detected by the transceiver from the third positioning element at the first instance, the third reflection corresponding to at least a portion of the third emitted signal reflected by the third positioning element.

Various embodiments are directed to an elevator positioning system, comprising: a transceiver disposed within an elevator shaft; a reflector element mounted to a mounting surface within the elevator shaft such that a first signal emitted from the transceiver engages the reflector element at a reflecting face, the reflector element being arranged relative to the transceiver such that the distance between the first positioning element and the transceiver varies as an elevator car moves along a vertical axis within the elevator shaft; wherein the reflector element comprises an at least partially dynamic configuration such that the reflecting face may maintain an at least substantially horizontal configuration independent of an angular configuration of the mounting surface.

In various embodiments, the reflector element may embody a gravity hammer comprising a reflector plate having a range of motion relative to a base element configured to facilitate the mounting of the reflector element to the mounting surface. In various embodiments, the reflecting face may be defined by a volume of reflecting liquid. In certain embodiments, the reflector element comprises a liquid tank configured to house the volume of reflecting liquid and facilitate the mounting of the reflector element to the mounting surface; wherein the reflector element is configured such that at least a portion of the liquid tank is mounted to the mounting surface so as to define a tilted angular configuration. In certain embodiments, the elevator positioning system may further comprise a controller configured to determine a liquid level of the volume of reflecting liquid within the liquid tank based at least in part on a first reflection detected by the transceiver from the reflecting face at the first instance and a second reflection detected by the transceiver from the liquid tank at the first instance.

Various embodiments are directed to an elevator positioning system, comprising: a transceiver disposed within an elevator shaft; a reflector element arranged within the elevator shaft such that a signal emitted from the transceiver engages the reflector element at a reflecting face, wherein the reflecting face comprises one or more orifices extending therethrough; wherein the reflecting face is configured to reflect a first signal portion of the signal, and wherein the one or more orifice extending through the reflecting face is configured to receive a second signal portion of the signal such that the second signal portion passes through the one or more orifices.

In various embodiments, the one or more orifice may comprise a plurality of orifices. In various embodiments, at least a first portion of the plurality of orifices may be disposed about an outer perimeter of a reflecting face; and wherein at least a second portion of the plurality of orifices are disposed about an inner portion of the reflecting face.

BRIEF DESCRIPTION OF THE DRAWINGS

Reference will now be made to the accompanying drawings, which are not necessarily drawn to scale, and wherein.

DETAILED DESCRIPTION

Figure 1A:
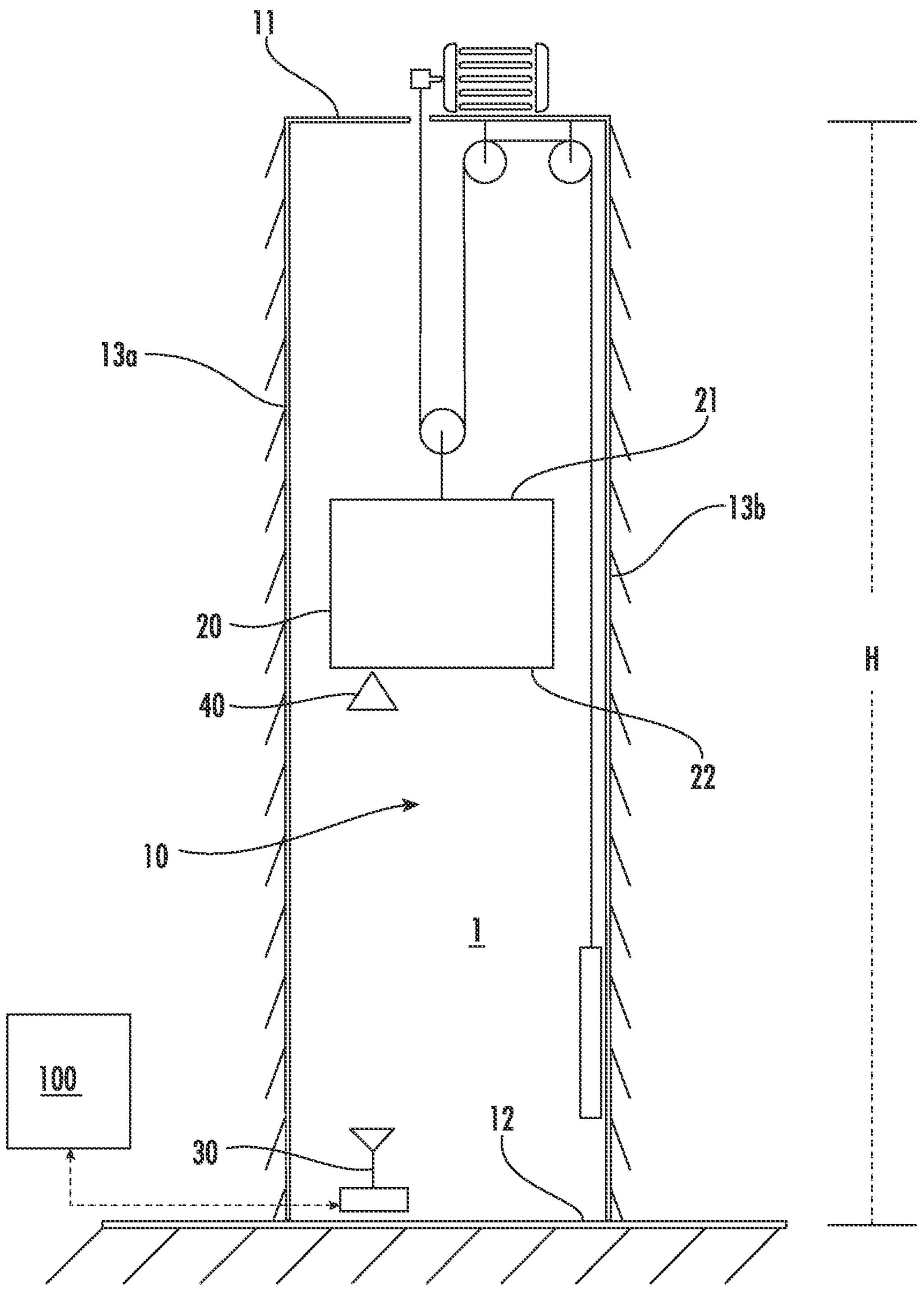
FIGS. 1A-1D schematically illustrate an exemplary system in accordance with various embodiments.
Figure 1B:
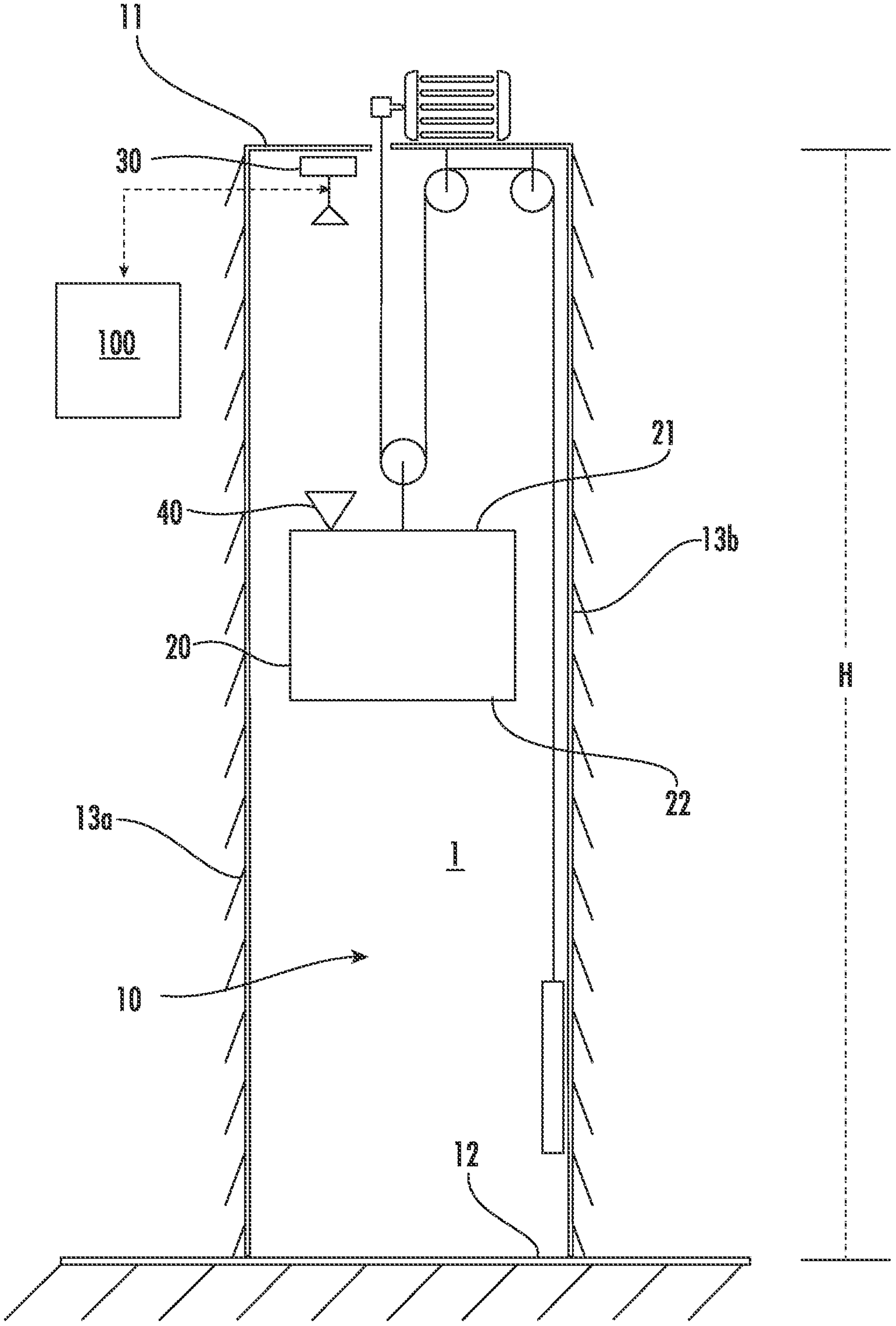
Figure 1C:
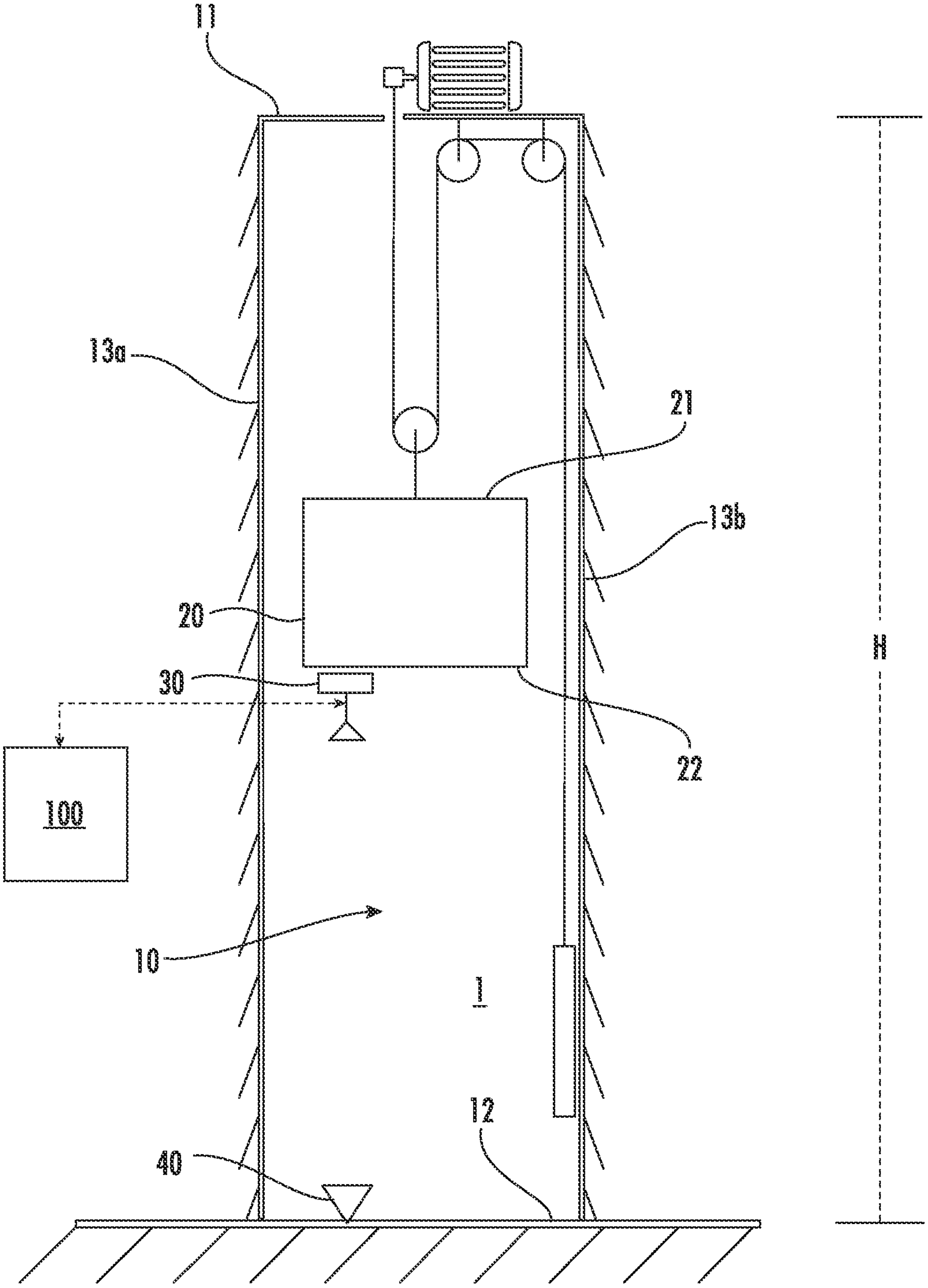
Figure 1D:
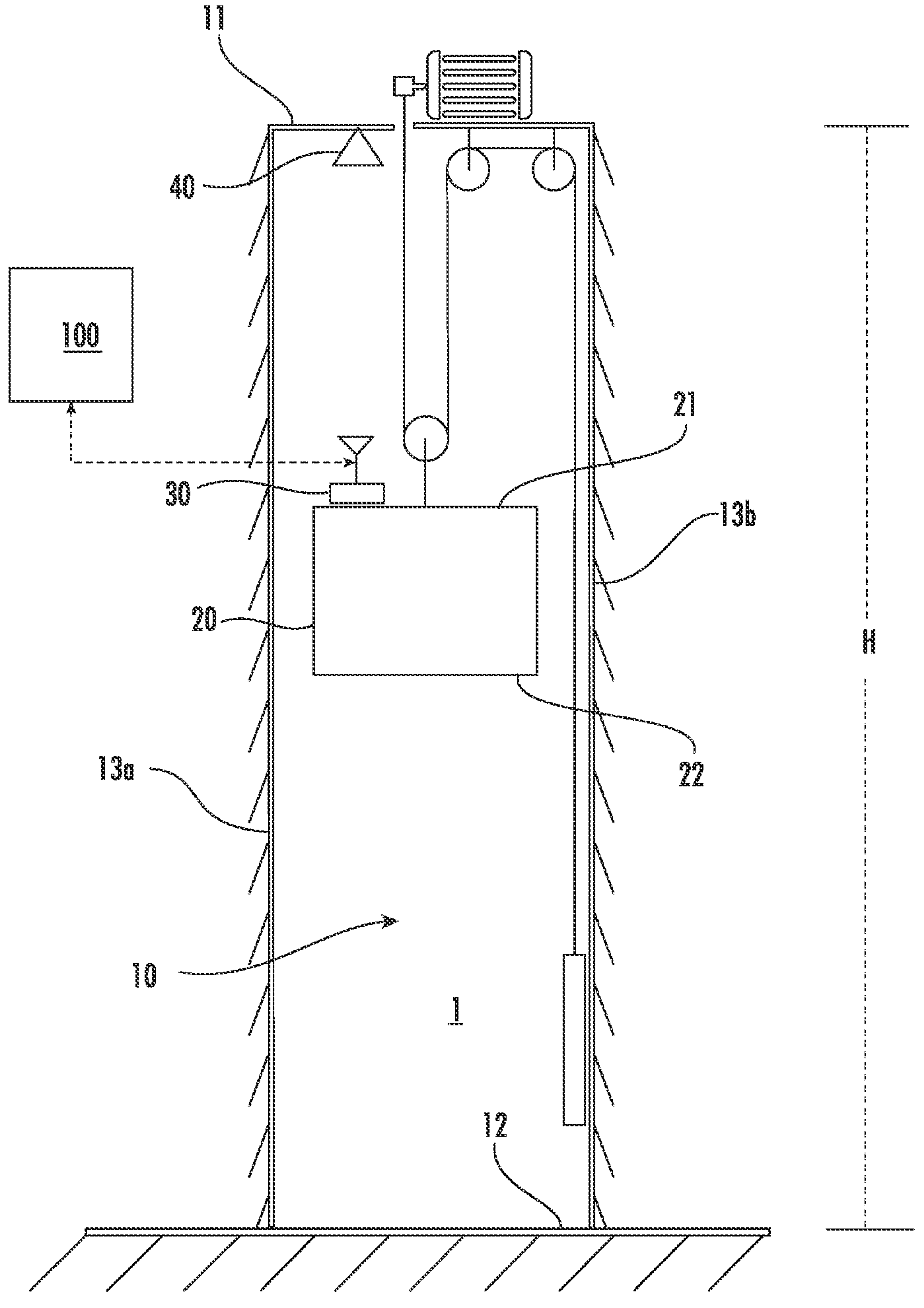

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations.

Described herein is a device configured to characterize and monitor the relative position (e.g., the relative height) of an elevator car within an elevator shaft, such that the elevator car may move between one or more desired locations along the elevator shaft. In various applications, elevator systems may be configured to transport an elevator car throughout an elevator shaft between floors of a multi-level building. In various circumstances, the range of motion of the elevator car within the shaft may extend vertically between a bottom building level and a top building level, which may correspond to an elevator shaft having a height of at least approximately between 100 m-150 m. Accordingly, over such an elongated range of motion, minor inaccuracies and/or misalignment may be amplified, so as to result in a failure condition wherein, for example, an elevator car is moved to a vertical position corresponding to a floor of a multi-floor building, but the elevator car is stopped in a positioned that does not align with the plane of the desired floor. For example, over time, an elevator shaft may experience a change in height caused by thermal expansion, material compression, and/or the like. As an illustrative example, the expansion coefficient for a traditional building may be approximately 10 ppm/° C. With such an expansion coefficient, a building (e.g., an elevator shaft) with a height of 100 m will expand at least approximately 50 mm over a temperature range of between −20° C. and 30° C., an expansion distance that surpasses many industry-mandated standards for level difference (e.g., between the car surface and the building floor surface), such as, for example, the GB-7588 mandated standard requiring a level difference of less than 10 mm. Accordingly, a need exists for an accurate elevator positioning system that is able to compensate for the thermal expansion and/or compression of an elevator shaft.

Accordingly, various elevator positioning systems may utilize various sensor elements, such as, for example, radar detectors disposed about an elevator shaft to monitor the position of the elevator car within the elevator shaft. As described herein, however, an elevator positioning system configured to utilized various sensor elements, such as, for example, a radar sensor may be subject to various system inaccuracies caused by signal interference within an elevator shaft. For example, an exemplary elevator positioning system comprising a transceiver and a corresponding reflector element may be configured such that the signal emitted by the transceiver and a reflection produced by the reflector element each extend from the respective components in a conical direction. As the distance between the two elements increases, the amount of the signal and/or reflection that is directed to a portion of the elevator shaft other than directly between the transceiver and the reflector becomes increasingly large. The divergent portion of an emitted signal and/or a reflection may be reflected, refracted, and/or diffracted within an elevator shaft such that one or more interference signals are generated within the elevator shaft. As described herein, one or more interference signals within the elevator shaft may cause multi-path interference, for example, between the reflector, an elevator car door, a structural fixture within the elevator shaft, and/or the like, that may affect the performance of an elevator positioning system. For example, in such an exemplary circumstance, a transceiver may be unable to detect the portion of the reflection that is reflected directly to the transceiver from the reflector plate, and/or may detect a signal that is at least partially obstructed and/or distorted (e.g., defining an increased and/or decreased amplitude).

Further, exemplary elevator positioning systems comprising a transceiver and a corresponding reflector element configured to facilitate a determination of the position of the elevator car within an elevator shaft may be subject to one or more system inaccuracies caused by, for example, a misalignment of one or more reflector elements relative to the transceiver. For example, in a circumstance wherein a reflector element is installed so as to be tilted at an angle away from a transceiver, and/or, over time, undergoes an angular shift relative to the transceiver such that reflecting face of the reflector element does not directly face the emitting face of the transceiver, the signal strength of a reflection detected by the transceiver from the tilted reflection element may be weaker than that of a reflection from a reflection element directly aligned with the transceiver. Such a tilted configuration of a receiving face of the reflector element may result in a reflection signal detected by the transceiver that is at least partially obstructed and/or distorted (e.g., defining an increased and/or decreased amplitude at one or more locations, defining a decreased peak point about one or more frequencies). As described herein, such inaccuracies caused by the various distorted signal conditions described above may greatly reduce the effectiveness of the elevator positioning system and may, in various circumstance, result in one or more failure conditions wherein the level difference exhibited by the elevator car at a particular instance does not satisfy one or more industry-standard maximum allowable level difference thresholds.

In various embodiments described herein, the present invention includes an exemplary elevator positioning system configured to determine the relative position (e.g., the relative height) of an elevator car within an elevator shaft as measured in a vertical direction based on one or more car positioning determination operations configured to programmatically compensate for the expansion and/or compression of the elevator shaft (e.g., one or more vertical shaft portions thereof) in the vertical direction, such that the elevator car may be positioned within a horizontal plane that is at least substantially aligned with a desired position relative to an external environment. In various embodiments, an exemplary elevator positioning system may determine the relative height of an elevator car within an elevator shaft based at least in part on a first determined distance between a transceiver and a first positioning element (e.g., a reflector element), as well as a second determined distance between a transceiver and a second positioning element (e.g., a calibration reflector element). Such an exemplary configuration, as described herein, facilitates the accurate, rapid determination of the position of an elevator car within the shaft, while minimizing the inaccuracies injected into the positioning system by vertical shaft displacements caused by thermal expansions and/or compressions of the elevator shaft.

Further, in various embodiments, an exemplary reflector element described herein may be configured to at least partially reduce interference within an elevator shaft caused by multi-path reflection. For example, in various embodiments, an exemplary reflector element may comprise a reflector plate configured to reduce an at least a portion of reflections reflected therefrom that may result in interference signals within the elevator shaft. As described herein, in various embodiments, an exemplary reflector element may comprise a reflecting plate comprising one or more orifices extending therethrough, such that at least a portion of the receiving face is defined by the one or more orifices. The one or more orifices about the receiving face of the reflector element may reduce at least a portion of a reflection reflected from the reflector plate that may result in interference signals within the elevator shaft.

Further still, an exemplary elevator positioning system according to various embodiments described herein may comprise a reflector elements configured such that the receiving face thereof maintains an at least substantially horizontal configuration within a substantially horizontal plane (e.g., aligned directly with an emitting face of a transceiver) independent of the configuration of the surface to which the reflector element is secured. For example, as described herein, an exemplary reflector element may comprise an at least partially dynamic configuration wherein the angular configuration of the reflecting face may be independent of the angular configuration of the surface to which the reflector element is secured and/or one or more at least substantially rigid components of the reflector element. As described herein, the at least substantially horizontal configuration of the reflecting surface of the reflector element may be maintained in spite of one or more adjacent components within the elevator shaft defining a tilted configuration. Such an exemplary configuration be configured to reduce various inaccuracies, interferences, and/or obscurities associated with the reflector element being mounted to a tilted mounting surface that definiens a tilted angular configuration relative to the transceiver.

FIGS. 1A-1D schematically illustrate an exemplary elevator positioning system 1 according to various embodiments described herein. In various embodiments, an exemplary elevator positioning system may comprise a transceiver and one or more positioning elements, and may be configured to determine the position of an elevator car within an elevator shaft. For example, an elevator positioning system may be configured to determine the relative position (e.g., the relative height) of an elevator car within an elevator shaft as measured in a vertical direction (e.g., a direction extending parallel to a central axis of the elevator shaft along a height of the elevator shaft). As illustrated in FIGS. 1A-1D, an exemplary elevator positioning system 1 may comprise a transceiver 30 and one or more positioning elements (e.g., a reflector element 40). In various embodiments, the transceiver 30 and the one or more positioning elements may be arranged within an elevator shaft 10 such that elevator positioning system 1 may determine a position of the elevator car 20 within the elevator shaft 10 at a particular instance.

In various embodiments, an elevator shaft may comprise an internal shaft portion configured to house an elevator car 20 such that a full range of motion of the elevator car 20 exists within the internal shaft portion of the elevator shaft. As illustrated, the internal shaft portion of the elevator shaft 10 may be defined within a plurality of outer walls of the shaft 10, such as, for example, a top shaft surface 11, a bottom shaft surface 12, and one or more sidewalls 13 extending in a substantially vertical direction between the top shaft surface 11 and the bottom shaft surface 12 (e.g., a first sidewall 13*a* and a second sidewall 13*b*). In various embodiments, the shaft height H of the elevator shaft 10 may be defined by a distance between the top shaft surface 11 and the bottom shaft surface 12, as measured in the vertical direction. For example, in various embodiments, one or more of the top shaft surface 11 and the bottom shaft surface 12 may be centered about the central axis of the elevator shaft 10 such that a perpendicular axis extending from a center of the respective surface may be coaxial with the central axis of the elevator shaft 10. Further, in various embodiments, one or more of the top shaft surface 11 and the bottom shaft surface 12 may comprise at least substantially planar surfaces extending along a horizontal plane. As a non-limiting example, each of the top shaft surface 11 and the bottom shaft surface 12 may extend along a respective horizontal plane such that the top shaft surface 11 and the bottom shaft surface 12 are parallel to one another. In such an exemplary configuration, the height of the elevator shaft 10 may be defined by the distance along the central axis of the elevator shaft 10 between the top shaft surface 11 and the bottom shaft surface 12. As described in further detail herein, in various embodiments, the shaft height H of the elevator may be based at least in part on the length of the one or more sidewalls 13 in the vertical direction such that the shaft height H may vary over time corresponding to a change in length of the one or more sidewalls 13 due to, as non-limiting examples, thermal expansion, material compression, and/or the like.

In various embodiments, an elevator car 20 disposed within an elevator shaft 10 may be configured in a substantially level configuration wherein a top car surface 21 and a bottom car surface 22 each comprise an at least substantially planar surface extending along respective horizontal planes, each plane being perpendicular to the vertical direction, as described herein. For example, the top car surface 21 and the bottom car surface 22 may be parallel to one another. Further, in various embodiments, the top car surface 21 and the bottom car surface 22 may be parallel to one or more of the top shaft surface 11 and the bottom shaft surface 12. As illustrated, in various embodiments, the elevator car 20 may be configured such that the top car surface 21 is arranged in an upward-facing configuration so as to face toward the top shaft surface 11 of the elevator shaft 10 positioned vertically above the elevator car 20. Further, in various embodiments, the elevator car 20 may be configured such that bottom car surface 22 is arranged in a downward-facing configuration so as to face toward the bottom shaft surface 12 of the elevator shaft 10 positioned vertically beneath the elevator car 20. In various embodiments, an elevator car 20 may be installed within an elevator shaft 10 in an at least partially suspended configuration such that one or more gravitational forces acting on the car 20 may stabilize the bottom car surface 22 in an at least substantially horizontal configuration perpendicular to the vertical direction.

In various embodiments, the elevator car 20 may have a range of motion within the internal shaft portion elevator shaft 10 that may be defined about at least a portion of the internal shaft portion of the elevator shaft 10 between the top shaft surface 11 and the bottom shaft surface 12 in an at least substantially vertical direction (e.g., along at least a portion of the central axis of the elevator shaft 10). In various embodiments, the transceiver 30 and the one or more positioning elements (e.g., reflector element 40) may be configured to enable a determination of the relative height of the elevator car 20 within the elevator shaft 10, as measured along the shaft central axis relative to one or more portions of the elevator shaft 10, such as, for example, the bottom shaft surface 12, the top shaft surface 11, one or more horizontal planes corresponding to intermediate floors between the bottom shaft surface 12 and the top shaft surface 11, and/or the like.

As described herein, in various embodiments, the elevator positioning system 1 may comprise a transceiver 30 configured to emit a signal (e.g., a RF wave, a radar wave, and/or the like) and receive a reflection comprising at least a portion of the emitted signal reflected back from one or more components of the elevator positioning system 1 (e.g., a reflector element 40). As a non-limiting example, in various embodiments, the transceiver 30 may comprise a single chip, Frequency Modulation Continuous Wave (FMCW) element be configured to emit a signal comprising a 60 GHz radar wave. In various embodiments, a transceiver 30 may be configured to receive a reflection and subsequently transmit transceiver signal data indicative of the detected reflection to a controller 100, as described herein. As a non-limiting example, in various embodiments, the transceiver 30 may be configured to detect one or more signals present within an elevator shaft (e.g., a reflection) using a dielectric lens antenna.

In various embodiments, a transceiver 30 may be attached to a surface such that the transceiver 30 is disposed within the internal shaft portion of the elevator shaft 10 and arranged in an at least substantially vertical configuration (e.g., facing a vertically upward direction, facing a vertically downward direction). For example, in various embodiments, the transceiver 30 may be fixedly secured to an at least substantially horizontal surface of an elevator shaft 10 and/or an elevator car 20. As non-limiting examples illustrated in FIGS. 1A-1D, a transceiver 30 may be fixedly secured to a top shaft surface 11, a bottom shaft surface 12, a top car surface 21, and/or a bottom car surface 22. In various embodiments, a transceiver 30 may define a transmission face through which one or more signals may be emitted and/or received by the transceiver 30. As illustrated, the transceiver 30 may be positioned such that the transmission face faces away from the surface to which the transceiver 30 is coupled in direction perpendicular to said surface. For example, the transceiver 30 may be positioned such that the transmission face faces an at least substantially vertical direction (e.g., a vertically upward direction, a vertically downward direction) away from the surface to which the transceiver 30 is coupled.

In various embodiments, the elevator positioning system 1 may further comprise one or more positioning elements configured to facilitate the car position detection operation of the elevator positioning system. As illustrated in FIGS. 1A-1D, the one or more positioning elements of the elevator positioning system 1 may comprise a reflector element 40 disposed within the elevator shaft 10. In various embodiments, a reflector element 40 may be positioned along an emission path of a signal emitted from a transceiver 30 such that a reflecting face of the reflector element 40 may be engaged by at least a portion of the emitted signal. The reflector element 40 may be configured to reflect the at least a portion of the emitted signal from the reflecting face so as to cause the reflection to travel in a substantially different direction from that of the emitted signal. For example, a reflection may travel in a substantially opposite vertical direction from that in which the emitted signal was traveling prior to engaging the reflector element 40, such as, for example, a vertical direction towards the transceiver 30. As a non-limiting example, in various embodiments, a reflector element 40 may comprise a retroreflector.

In various embodiments, a reflector element 40 may be attached to a surface such that the reflector element 40 is disposed within the internal shaft portion of the elevator shaft 10 and arranged in an at least substantially vertical configuration (e.g., facing a vertically upward direction, facing a vertically downward direction). For example, in various embodiments, the reflector element 40 may be fixedly secured to an at least substantially horizontal surface of an elevator shaft 10 and/or an elevator car 20. As non-limiting examples illustrated in FIGS. 1A-1D, a reflector element 40 may be fixedly secured to a top shaft surface 11, a bottom shaft surface 12, a top car surface 21, and/or a bottom car surface 22. As described in further detail herein, in various embodiments, a reflector element 40 may comprise a reflecting face configured to receive and reflect at least a portion of a signal emitted from the transceiver 30. As illustrated, the reflector element 40 may be positioned such that the reflecting face faces away from the surface to which the reflector element 40 is coupled in direction perpendicular to said surface. For example, the reflector element 40 may be positioned such that the reflecting face faces an at least substantially vertical direction (e.g., a vertically upward direction, a vertically downward direction) away from the surface to which the reflector element 40 is fixedly secured.

In various embodiments, a positioning element (e.g., reflector element 40) may be aligned with a transceiver 30, such as, for example, along an at least substantially vertical axis. For example, in various embodiments, the reflector element 40 and the transceiver 30 may be aligned within the elevator shaft 10 so as to face one another. In particular, for example, the transmission face of the transceiver 30 may be facing toward the reflecting face of reflector element 40 such that high frequency waves generated by the transceiver 30 and emitted from the transmission face thereof may travel towards the reflecting face of the reflector element 40. In such an exemplary configuration, the reflector element 40 and the transceiver 30 may be arranged to face at least substantially opposite directions along a vertical axis that runs parallel to the central axis of the elevator shaft 10 in the vertical direction. The transceiver 30 emits one or more signals (e.g., high frequency ultrasonic signals) in the direction of the reflector element 40 such that the reflector element 40 (e.g., via a reflecting face) may reflect a reflection corresponding to at least a portion of the emitted signal back to the transceiver 30.

In various embodiments, one of a transceiver 30 and a reflector element 40 may be fixedly secured to a surface of the elevator shaft 10 while the other of the transceiver 30 and the reflector element 40 is fixedly secured to a surface of the elevator car 20. As non-limiting examples, FIGS. 1A-1D illustrate various exemplary embodiments where transceiver 30 may be secured to a bottom shaft surface 12 while reflector element 40 is secured to a bottom car surface 22; transceiver 30 may be secured to a top shaft surface 11 while reflector element 40 is secured to a top car surface 21; transceiver 30 may be secured to a bottom car surface 22 while reflector element 40 is secured to a bottom shaft surface 12; and/or transceiver 30 may be secured to a top car surface 21 while reflector element 40 is secured to top shaft surface 11. In such exemplary circumstances, a movement of elevator car 20 about the elevator shaft 10 in a vertical direction defines a change in the vertical distance between the transceiver 30 and the reflector element 40.

In various embodiments, transceiver 30 may be configured to detect (e.g., receive) a reflection and generate transceiver signal data corresponding at least in part to the received reflection. For example, in various embodiments, transceiver signal data may embody a reflection, data corresponding to a reflection, and/or the like, that is configured for conversion and/or transmission as an output electric signal. In various embodiments, transceiver 30 may be in communication and/or electronically connected to a controller 100 that may be configured to facilitate communication and functional control therebetween. For example, the transceiver 30 may be configured to transmit transceiver signal data to controller 100, which may be configured to receive and/or process the transceiver signal data so as to facilitate the car position detection operation of the elevator positioning system, as described in further detail herein. By way of further non-limiting example, in various embodiments, transceiver signal data from the transceiver 30 may be processed by the controller 100 in order to determine a distance between the transceiver 30 and the reflector element 40 at a given instance, which may be at least partially indicative of the position (e.g., relative height) of the elevator car 20 within the elevator shaft 10.

Figure 2B:
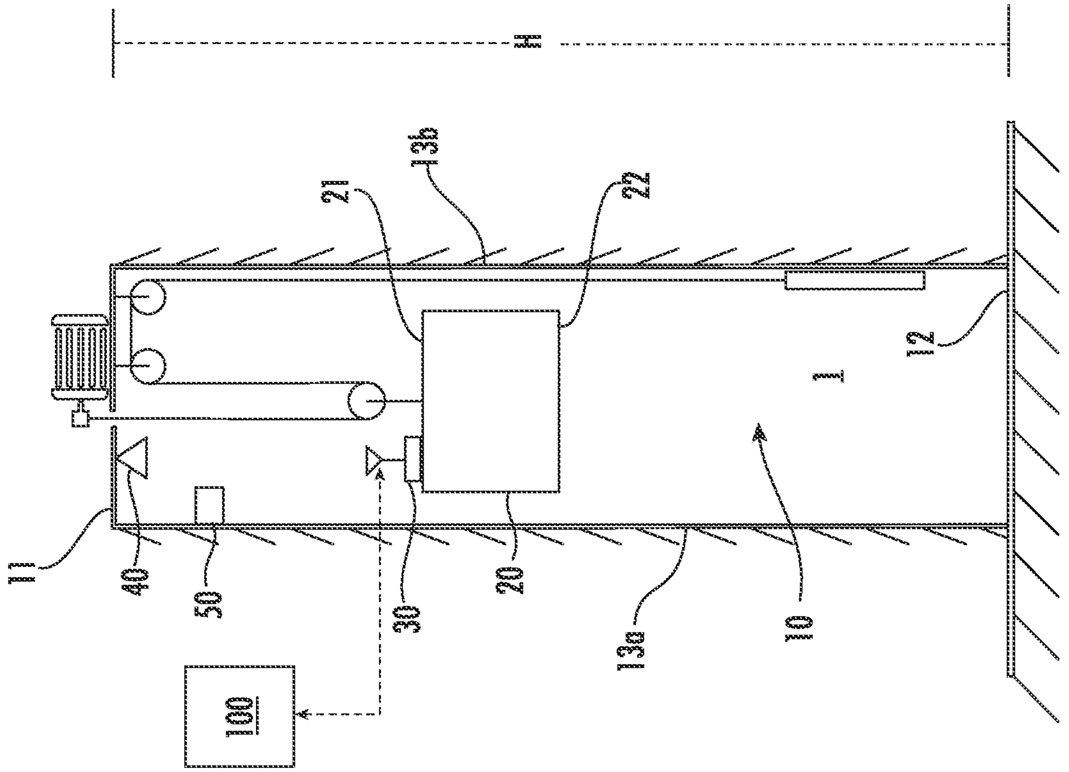
FIGS. 2A-2D schematically illustrate an exemplary system in accordance with various embodiments.
Figure 2A:
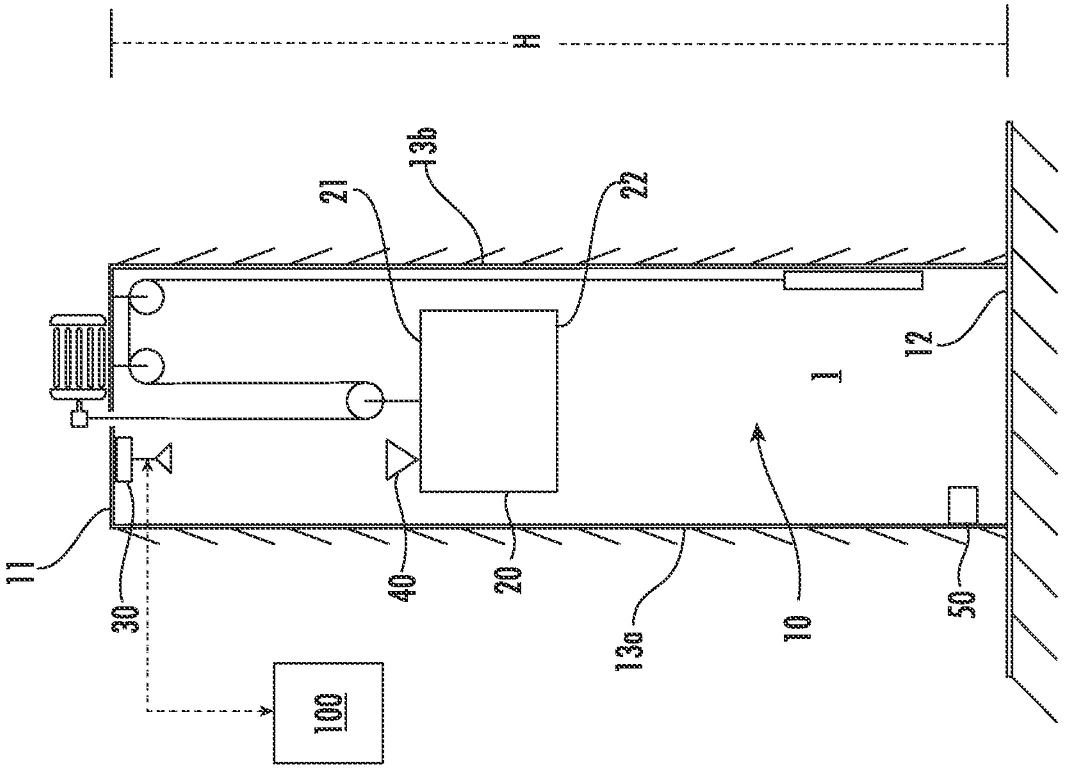

In various embodiments, the one or more positioning elements of the elevator positioning system 1 may comprise a plurality of positioning elements. For example, in various embodiments, an elevator positioning system 1 comprising a plurality of positioning elements may comprise a plurality of reflector elements. In various embodiments, an exemplary elevator positioning system 1 may be configured such that one or more of a plurality of positioning elements may comprise a calibration positioning element. As illustrated in FIGS. 2A and 2B, the plurality of positioning elements of the elevator positioning system 1 may comprise a plurality of reflector elements including a first reflector element 40 and a calibration reflection element 50. An exemplary elevator positioning system 1 may utilize a transceiver 30 and a plurality of positioning elements, such as, for example, reflector element 40 and calibration reflector element 50, to identify and characterize a change in shaft height H over time in order to facilitate a car position detection operation that accommodates shaft height H variability so as to at least substantially maintain a relative position of an elevator car 20 within an elevator shaft 10.

In various embodiments, a calibration reflection element 50 may comprise a reflector element distinct from a first reflector element (e.g., reflector element 40) that may be fixedly secured to a shaft sidewall 13 of an elevator shaft 10 and/or a structural element adjacent thereto. For example, a calibration reflection element 50 may be fixedly secured to a shaft sidewall 13 at a location along the shaft height H of the elevator shaft 10 so as to prevent a relative motion between the calibration reflection element 50 and the at least substantially vertical portion of the shaft sidewall 13 to which the calibration reflection element 50 is secured. In various embodiments, calibration reflection element 50 may be arranged about an internal shaft portion of an elevator shaft 10 and configured such that the calibration reflection element 50 may be engaged by at least a portion of a signal emitted from a transceiver 30 at a reflecting face of the calibration reflection element 50. As described in further detail herein, in various embodiments, a calibration reflection element 50 may comprise a reflecting face configured to receive and reflect at least a portion of a signal emitted from the transceiver 30. For example, in various embodiments, the reflecting face of a calibration reflection element 50 may be defined by a surface of the calibration reflection element 50 that faces an at least substantially vertical direction (e.g., a vertically upward direction, a vertically downward direction) toward a transceiver 30. As a non-limiting example, in various embodiments, a calibration reflection element 50 may be embodied by a structural fixture of an elevator system disposed within the elevator shaft 10, such as, for example, a component of structural frame component of an elevator car rail system. In such an exemplary circumstance, the component of structural frame component of an elevator car rail system embodying, within the elevator positioning system 1, a calibration reflector element 50 may be fixed relative to a portion of a shaft sidewall 13 along the shaft height H of the elevator shaft 10.

In various embodiments, a transceiver 30 may emit one or more signals (e.g., high frequency ultrasonic signals) in a direction toward the calibration reflector element 50 such that the calibration reflector element 50 (e.g., via a reflecting face) may reflect a reflection corresponding to at least a portion of the emitted signal back towards the transceiver 30. Further, in various embodiments, transceiver 30 may be configured to detect (e.g., receive) a reflection reflected from a calibration reflector element 50 and generate transceiver signal data corresponding at least in part to the received reflection. By way of non-limiting example, in various embodiments, at least a portion of transceiver signal data from the transceiver 30 may be processed by the controller 100 in order to determine a distance between the transceiver 30 and the calibration reflector element 50 at a particular instance, which may be at least partially indicative of a vertical displacement of shaft sidewall 13 portion to which the calibration reflector element 50 is coupled relative to the transceiver 30. As described in further detail herein, the controller 100 may be configured to identify and characterize a change in shaft height H over time based at least in part on a comparison of the vertical position of the shaft sidewall 13 portion to which the calibration reflector element 50 is coupled at the particular instance to an initial vertical position (e.g., as measured at a time of installation) of the same portion of shaft sidewall 13. In such an exemplary circumstance, a determination by the controller 100 that the vertical distance between the transceiver 30 and the calibration reflector element 50 at the particular instance is different than an initially measured distance (e.g., at an installation instance) between the transceiver 30 and the calibration reflector element 50 may be indicative of a variance in shaft height H (e.g., shaft sidewall 13 expansion and/or compression in a vertical direction).

In various embodiments wherein transceiver 30 is configured to detect a first reflection from a calibration reflection element 50 and a second reflection from a reflection element 40, transceiver signal data may embody the first reflection, the second reflection, data corresponding to the first reflection and/or the second reflection, and/or the like. In various embodiments, as described herein, controller 100 may be configured to distinguish a first reflection produced by a calibration reflection element 50 from a second reflection produced by a reflection element 40 based at least in part on one or more signal characteristics defined by various transceiver signal data corresponding to the first reflection and/or the second reflection.

In various embodiments, an exemplary elevator positioning system 1 may utilize both a first reflection reflected from a calibration reflection element 50 and a second reflection reflected from a reflection element 40 to facilitate a car position detection operation that accounts for a variance in shaft height H between an initial installation time and a subsequent runtime by determining an adjusted elevator car position. In various embodiments, an adjusted elevator car position may be defined at least in part by a second runtime distance (e.g., a detected distance between the transceiver 30 and the reflector element 40 at the runtime instance) and an elevator car adjustment distance embodying an amount of adjustment required in order to counteract a vertical displacement of the elevator car 20 caused by the amount of vertical displacement exhibited by the elevator shaft 10 (e.g., via expansion and/or compression). For example, in various embodiments, a first initial distance between a transceiver 30 and a calibration reflector element 50 may be determined at an installation instance (e.g., at the time of installation of the elevator positioning system 1). As a non-limiting example, the first initial distance may be determined based at least in part on transceiver signal data provided by the transceiver 30 in response to the transceiver 30 detecting a first initial reflection reflected from the calibration reflector element 50. Alternatively and/or additionally, the first initial distance may comprise a predefined stored value (e.g., data) that may be accessed the controller 100 (e.g., via in one or more look-up tables stored in a memory of the controller 100).

Further, in various embodiments, a first runtime distance between a transceiver 30 and a calibration reflector element 50 and a second runtime distance between the transceiver 30 and a reflector element 40 may be determined at a runtime instance (e.g., at a time during the operational lifetime of the elevator positioning system 1), the runtime instance being subsequent to the aforementioned installation instance. For example, the first runtime distance and the second runtime distance may be determined based at least in part on transceiver signal data provided by the transceiver 30 in response to the transceiver 30 detecting, at the runtime instance, a first runtime reflection reflected from the calibration reflector element 50 and a second runtime reflection reflected from the reflector element 40, respectively. In various embodiments, as described in further detail herein, the controller 100 may be configured to determine the adjusted elevator car position based at least in part on the first initial distance, the first runtime distance, and the second runtime distance. For example, as described in further detail herein, the controller 100 may be configured to determine the adjusted elevator car position based at least in part on a defined relationship between the first initial distance, the first runtime distance, and the second runtime distance.

Figure 2D:
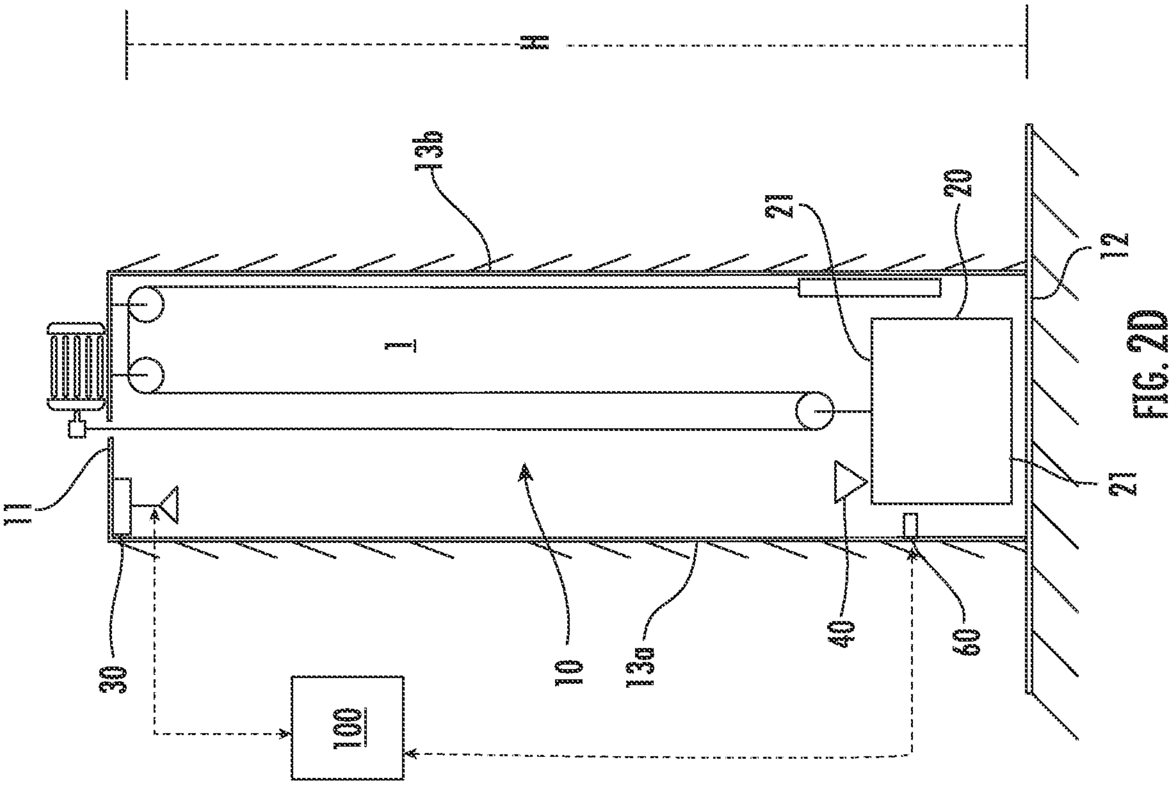
Figure 2C:
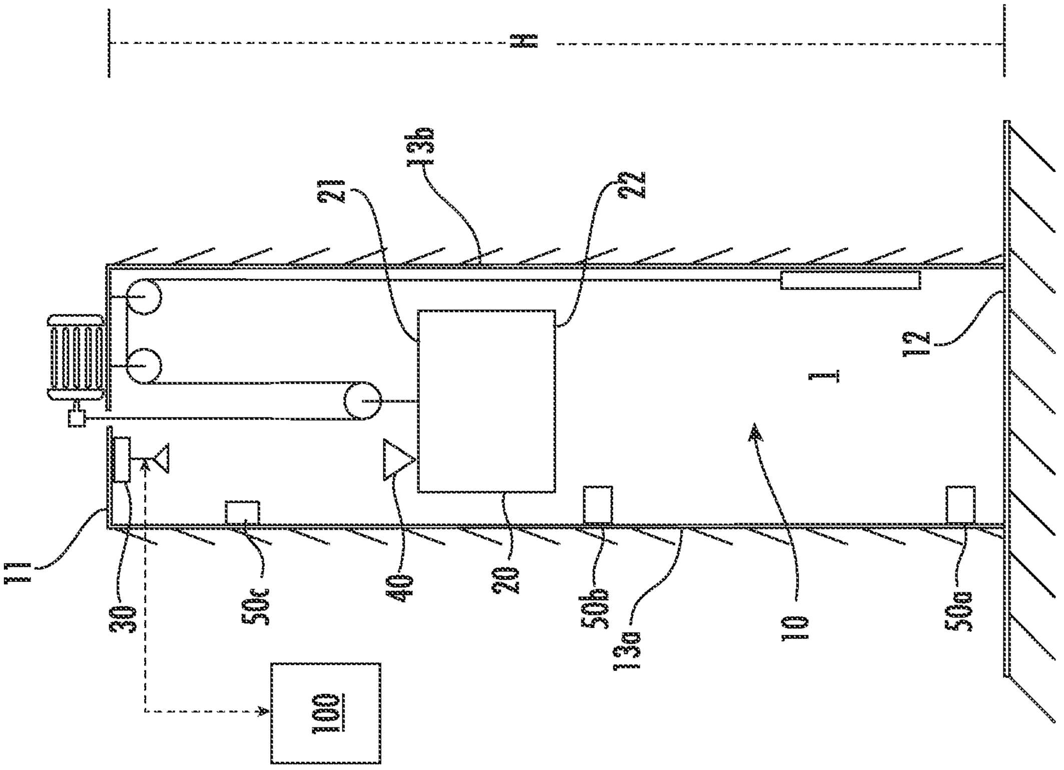

In various embodiments, a plurality of positioning elements of an exemplary elevator positioning system 1 may comprise a reflector element and a plurality of calibration reflector elements. As illustrated in FIG. 2C, the plurality of positioning elements of the elevator positioning system 1 may comprise a plurality of reflector elements including a first reflector element 40 and a plurality of calibration reflection elements 50*a*, 50*b*, 50*c*. In various embodiments, an exemplary elevator positioning system 1 may utilize a transceiver 30 and a plurality of positioning elements, such as, for example, reflector element 40 and one or more of a plurality of calibration reflector elements 50*a*, 50*b*, 50*c*, to identify and characterize a change in shaft height H over time in order to facilitate a car position detection operation that accommodates shaft height H variability so as to at least substantially maintain a relative position of an elevator car 20 within an elevator shaft 10. For example, an exemplary elevator positioning system 1 comprising a plurality of calibration reflector elements 50*a*, 50*b*, 50*c* may be configured to identify and characterize one or more localized expansions and/or compressions within a particular portion of a shaft sidewall 13 corresponding, at least in part, to one or more of the calibration reflector elements 50*a*, 50*b*, 50*c*. In various embodiments, a plurality of plurality of calibration reflector elements of an exemplary elevator positioning system may comprise at least substantially between two and 200 calibration reflector elements (e.g., between two and three calibration reflection elements). For example, in various embodiments, one or more calibration reflector elements of the plurality may be respectively positioned proximate each of a plurality of building floors (e.g., stories) within a building, such that each of the plurality of calibration reflector elements 50*a*, 50*b*, 50*c* is oriented about a respective horizontal plane that is at least substantially coplanar with one of the plurality of building floors. In a particular non-limiting example, in various embodiments, the plurality of plurality of calibration reflector elements of an exemplary elevator positioning system may comprise two calibration reflector elements in an exemplary circumstance wherein the thermal expansion coefficient of the elevator shaft 10 may be assumed to be at least substantially the same throughout the shaft height H of the shaft 10. As a further particular non-limiting example, in various embodiments, the plurality of plurality of calibration reflector elements of an exemplary elevator positioning system may comprise three or more calibration reflector elements in an exemplary circumstance wherein the thermal expansion coefficient of the elevator shaft 10 may be assumed to be at least substantially different at one or more vertical shaft portions along the shaft height H of the shaft 10.

In various embodiments, the transceiver 30 may emit one or more signals (e.g., high frequency ultrasonic signals) in a direction toward each of the plurality of calibration reflector elements 50*a*, 50*b*, 50*c* such that each calibration reflector element 50*a*, 50*b*, 50*c* (e.g., via a respective reflecting face) may reflect a reflection corresponding to at least a portion of the emitted signal back towards the transceiver 30. Further, in various embodiments, transceiver 30 may be configured to detect (e.g., receive) a plurality of reflections reflected from each of the plurality of calibration reflector elements 50*a*, 50*b*, 50*c* and generate transceiver signal data corresponding at least in part to each of the received reflections. In various embodiments wherein transceiver 30 may be configured to detect a plurality of reflections from a respective plurality of calibration reflection elements 50*a*, 50*b*, 50*c*, and/or a reflection from a reflection element 40, transceiver signal data may embody at least a portion of the plurality of reflections detected by the transceiver 30 (e.g., each of the plurality reflections detected by the transceiver 30), data corresponding to one or more of the at least a portion of the plurality of reflections, and/or the like. In various embodiments, as described herein, controller 100 may be configured to associate a detected reflection with a particular calibration reflection element of the plurality (e.g., first calibration reflector element 50*a*, second calibration reflector element 50*b*, third calibration reflector element 50*c*) and/or the reflection element 40 based at least in part on one or more signal characteristics defined by the respective reflections.

By way of non-limiting example, in various embodiments, at least a portion of transceiver signal data from the transceiver 30 may be processed by the controller 100 in order to determine a distance between the transceiver 30 and one or more of the plurality of calibration reflector elements at a particular instance, such as, for example, a first runtime distance between the transceiver 30 and the first calibration reflector element 50*a* and a second runtime distance between the transceiver 30 and the second calibration reflector element 50*b*. As described in further detail herein, the controller 100 may be configured to identify and characterize a local expansion and/or compression within a vertical portion of the shaft sidewall 13 between the first and second calibration reflector elements 50*a*, 50*b* over time based at least in part on a comparison of the first runtime distance and/or the second runtime distance at a runtime instance to a first initial distance and/or a second initial distance, respectively. In such an exemplary circumstance, the controller 100 may be configured to determine that the first runtime distance is different than the first initial distance and/or that the second runtime distance is different than the second initial distance. As described herein, the controller 100 may configured to, in response to such a determination, identify a local expansion and/or compression within a vertical portion of the shaft sidewall 13 between the first and second calibration reflector elements 50*a*, 50*b*.

As a further non-limiting example, in various embodiments, at least a portion of transceiver signal data may correspond to a first reflection reflected from the first calibration reflector element 50*a*, a second reflection reflected from the second calibration reflector element 50*b*, and a third reflection reflected from the third calibration reflector element 50*c*, which may be processed by the controller 100 in order to determine the respective vertical distances between the transceiver 30 and each of the first, second, and third calibration reflector elements 50*a*, 50*b*, 50*c* at a runtime instance, such as, for example, the first and second runtime distances, as described above, and further, a third runtime distance between the transceiver 30 and the third calibration reflector element 50*c*. In such an exemplary circumstance, the controller 100 may be configured to determine a substantially linear equation that may define a relationship between the location (e.g., defined in a vertical direction) of a particular shaft sidewall 13 portion along the shaft height H of the elevator shaft and an amount (e.g., magnitude) of vertical displacement (e.g., expansion and/or compression) realized at that particular shaft sidewall 13 portion between an installation instance and the runtime instance. In various embodiments, such a derived equation may be configured so as to define the aforementioned relationship throughout at least substantially an entirety of the shaft sidewall 13 of the elevator shaft 10. Alternatively, or additionally, such a derived equation may be configured so as to define the aforementioned relationship throughout a portion of the shaft sidewall 13 extending between adjacent calibration reflector elements of the plurality of calibration reflector elements 50*a*, 50*b*, 50*c*, such as, for example, throughout a portion of the shaft sidewall 13 extending between the second and third calibration reflector elements 50*b*, 50C.

As described herein, in various embodiments, a controller 100 of an exemplary elevator positioning system 1, as illustrated in FIG. 2C, may be configured to determine an adjusted elevator car position at a runtime instance based at least in part on a detected distance between the transceiver 30 and the reflector element 40 at the runtime instance and an elevator car adjustment distance. In various embodiments, an elevator car adjustment distance may be defined as an amount of adjustment required in order to counteract a vertical displacement of the elevator car 20 caused by an amount (e.g., magnitude) of vertical displacement (e.g., expansion and/or compression) realized, between an installation instance and the runtime instance, by a shaft sidewall 13 portion corresponding to a range of motion of the elevator car 20, as described herein. In various embodiments, as described in further detail herein, the controller 100 may be configured to determine the adjusted elevator car position based at least in part on a plurality of initial distances respectively associated with at least a portion of the plurality of calibration reflector elements, a plurality of runtime distances respectively associated with each of the same calibration reflector elements associated with the initial distances, and a reflector element runtime distance.

In various embodiments, a plurality of positioning elements of an exemplary elevator positioning system 1 may comprise a reflector element and a position switch element. As illustrated in FIG. 2D, the plurality of positioning elements of the elevator positioning system 1 may comprise a reflector element 40 and a position switch element 60 configured to detect the presence of at least a portion of the elevator car 20 at a vertical position within the elevator shaft 10 and, in response, generate an electric signal that may be transmitted to a controller 100 and/or a transceiver 30.

As illustrated, in various embodiments, a position switch element 60 may be fixedly secured to a shaft sidewall 13 of an elevator shaft 10 and/or a structural element adjacent thereto. For example, a position switch element 60 may be fixedly secured to the shaft sidewall 13 at a vertical position along the shaft height H of the elevator shaft 10 so as to prevent a relative motion between the position switch element 60 and the shaft sidewall 13 portion to which the position switch element 60 is secured. The vertical position of the position switch element 60 along the shaft sidewall 13 may be defined at least in part by cross-sectional plane of the elevator shaft 10 extending in a perpendicular direction relative to the central axis of the shaft 10. For example, in various embodiments, a position switch element 60 may be arranged at least partially within an at least substantially horizontal cross-sectional plane of the elevator shaft 10.

In various embodiments, the position switch element 60 may comprise one or more means for detecting that at least a portion of the elevator car 20 is positioned within the cross-sectional plane associated with the positional switch element 60. For example, as the elevator car 20 travels along a substantially vertical axis within the internal shaft portion of the elevator shaft 10, at least a portion of the elevator car 20 may pass through the cross-section plane associated with the position switch element 60 so as to trigger a generation of an electric signal by the position signal element 60, which may be further configured to transmit the generated signal to the controller 100. In various embodiments, the electrical signal transmitted to the controller 100 from the position switch element 60 may comprise elevator car position data corresponding to a vertical position of the elevator car 20 at a trigger instance (e.g., a time at which the position switch element 60 is triggered by the elevator car) and/or one or more system configuration instructions configured to cause the controller 100 to execute a car position detection operation that accounts for a variance in shaft height H between an initial installation time and a trigger instance by treating the reflector element 40 of the elevator positioning system 1 as a calibration reflector element, as described herein. For example, in such an exemplary circumstance wherein the position switch element 60 is in an engaged condition based on the position of the elevator car 20 within the shaft 10, transceiver 30 may be configured to detect a reflection reflected from the reflector element 40 and generate transceiver signal data corresponding at least in part to the received reflection. In such an exemplary circumstance, the controller 100 may be configured to determine a trigger distance between a transceiver 30 and the reflector element 40 at a trigger instance. As described herein, the trigger distance may be determined based at least in part on transceiver signal data provided by the transceiver 30 in response to the transceiver 30 detecting, at the trigger instance, a reflection reflected from the reflector element 40. In various embodiments, the trigger distance between the reflector element 40 and the transceiver 30 at the trigger instance may be defined at least in part by a vertical displacement of a shaft sidewall 13 portion to which the position switch element 60 is coupled.

As described in further detail herein, the controller 100 may be configured to identify and characterize a change in shaft height H over time based at least in part on a comparison of the trigger distance between the reflector element 40 and the transceiver 30 at a trigger instance to an initial calibration distance between the reflector element 40 and the transceiver 30 at an installation instance (e.g., as measured at a time of installation). In such an exemplary circumstance, a determination by the controller 100 that the trigger distance between the transceiver 30 and the reflector element 40 at the trigger instance is different than an initial calibration distance between the transceiver 30 and the reflector element 40 at an installation instance may be indicative of a variance in shaft height H (e.g., shaft sidewall 13 expansion and/or compression in a vertical direction) over a period of time between the installation instance and the trigger instance.

In various embodiments, at a runtime instance wherein the position switch element 60 is in a disengaged condition (e.g., the elevator car 20 is not positioned within the cross-sectional plane associated with the position switch element), transceiver 30 may be configured to detect a second reflection reflected from the reflector element 40 and generate transceiver signal data corresponding at least in part to the received second reflection. In such an exemplary circumstance, the controller 100 may be configured to determine to determine a reflector runtime distance between the transceiver 30 and the reflector element 40 at the runtime instance, wherein the runtime instance is subsequent to the trigger instance. For example, the controller 100 may be configured to determine the adjusted elevator car position based at least in part on the initial calibration distance, the trigger distance, and the reflector runtime distance. For example, the controller 100 may be configured to determine the adjusted elevator car position based at least in part on a defined relationship between the initial calibration distance, the trigger distance, and the reflector runtime distance.

Figure 3:
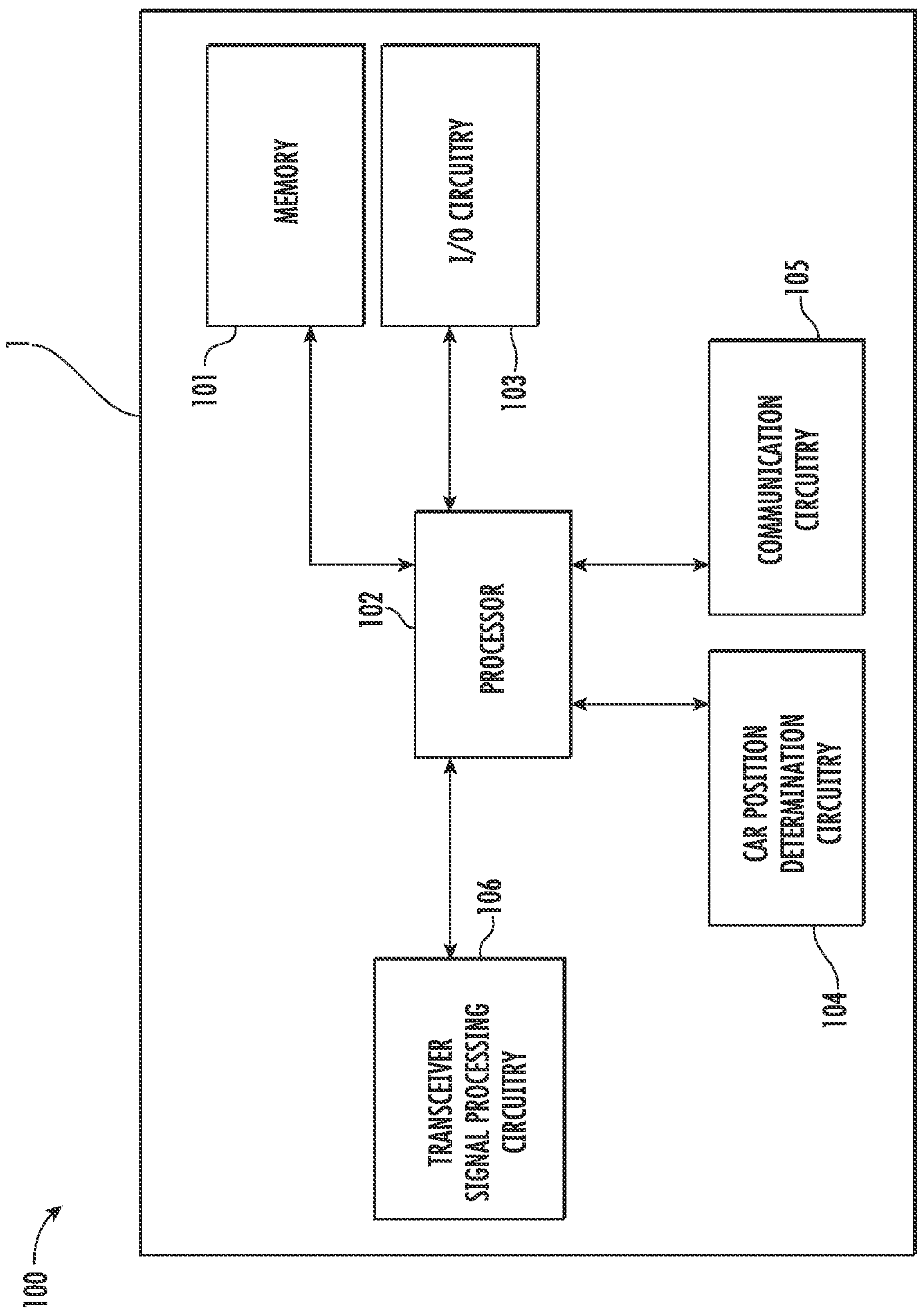
FIG. 3 schematically illustrates an exemplary apparatus for implementing various embodiments of the present disclosure.

As illustrated in FIG. 3, the controller 100 may comprise a memory 101, a processor 102, input/output circuitry 103, communication circuitry 105, transceiver processing circuitry 106, and car position determination circuitry 104. The controller 100 may be configured to execute one or more of the various operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the controller 100 should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the controller 100 may provide or supplement the functionality of particular circuitry. For example, the processor 102 may provide processing functionality, the memory 101 may provide storage functionality, the communications circuitry 105 may provide network interface functionality, and the like.

In some embodiments, the processor 102 (and/or co-processor or any other processing circuitry assisting or otherwise associated with the processor) may be in communication with the memory 101 via a bus for passing information among components of the apparatus. The memory 101 may be non-transitory and may include, for example, one or more volatile and/or non-volatile memories. For example, the memory 101 may be an electronic storage device (e.g., a computer readable storage medium). In various embodiments, the memory 101 may be configured to store information, data, content, applications, instructions, or the like, for enabling the apparatus to carry out various functions in accordance with example embodiments of the present disclosure. It will be understood that the memory 101 may be configured to store partially or wholly any electronic information, data, data structures, embodiments, examples, figures, processes, operations, techniques, algorithms, instructions, systems, apparatuses, methods, look-up tables, or computer program products described herein, or any combination thereof. As a non-limiting example, the memory 101 may be configured to store transceiver signal data, elevator car position data, system historical data, an/or the like. In various embodiments, the memory may be further configured to store one or more reflection coefficient look-up tables.

The processor 102 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 102 may be configured to execute instructions stored in the memory 101 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed. For example, in various embodiments, the processor 102 may comprise drive circuitry configured to generate a 104. For example, the drive circuitry configured to generate a signal defined at least in part by one or more predetermined signal characteristics, such as, for example, a signal frequency, to be received by a transmitter disposed within an elevator shaft and emitted towards one or more exemplary reflection elements, as described herein.

In some embodiments, the controller 100 may include input-output circuitry 103 that may, in turn, be in communication with the processor 102 to provide output to the user and, in some embodiments, to receive input such as a command provided by the user. The input-output circuitry 103 may comprise a user interface, such as a graphical user interface (GUI), and may include a display that may include a web user interface, a GUI application, a mobile application, a client device, or any other suitable hardware or software. In some embodiments, the input-output circuitry 103 may also include a display device, a display screen, user input elements, such as a touch screen, touch areas, soft keys, a keyboard, a mouse, a microphone, a speaker (e.g., a buzzer), a light emitting device (e.g., a red light emitting diode (LED), a green LED, a blue LED, a white LED, an infrared (IR) LED, an ultraviolet (UV) LED, or a combination thereof), or other input-output mechanisms. The processor 102, input-output circuitry 103 (which may utilize the processing circuitry), or both may be configured to control one or more functions of one or more user interface elements through computer-executable program code instructions (e.g., software, firmware) stored in a non-transitory computer-readable storage medium (e.g., memory 101). Input-output circuitry 103 is optional and, in some embodiments, the controller 100 may not include input-output circuitry. For example, where the controller 100 does not interact directly with the user, the controller 100 may generate user interface data for display by one or more other devices with which one or more users directly interact and transmit the generated user interface data to one or more of those devices. For example, the controller 100, using user interface circuitry may generate user interface data for display by one or more display devices and transmit the generated user interface data to those display devices.

The communications circuitry 105 may be a device or circuitry embodied in either hardware or a combination of hardware and software that is configured to receive and/or transmit data from/to a network and/or any other device, circuitry, or module in communication with the system 1 (e.g., transceiver 30). For example, the communications circuitry 105 may be configured to communicate with one or more computing devices via wired (e.g., USB) or wireless (e.g., Bluetooth, Wi-Fi, cellular, and/or the like) communication protocols.

In various embodiments, the processor 102 may be configured to communicate with the transceiver signal processing circuitry 106. The transceiver signal processing circuitry 106 may be a device or circuitry embodied in either hardware or a combination of hardware and software that is configured to receive, process, generate, and/or transmit data, such as transceiver signal data generated by the transceiver. In various embodiments, the transceiver signal processing circuitry 106 may be configured to receive and/or retrieve transceiver signal data from an exemplary transceiver. As described herein, in various embodiments, the transceiver signal data received by the transceiver signal processing circuitry 106 may comprise, for example, one or more reflections from the one or more positioning elements, such as, for example, a plurality of reflections produced by each of a reflector element and one or more calibration reflector elements, and signal data corresponding to each of the one or more reflections.

In various embodiments, transceiver signal processing circuitry 106 may be configured to distinguish a first reflection produced by a reflection element from one or more reflections produced by one or more calibration reflection elements, based at least in part on a signal analysis process and/or processes (e.g., an extreme point searching operation) configured to detect one or more signal characteristics, such as, for example, a signal frequency, signal amplitude, signal shape, and/or the like, corresponding specifically to the reflection produced by the reflection element. Further, transceiver signal processing circuitry 106 may be similarly configured to execute one or more signal analysis processes to detect, within a signal, one or more of the aforementioned signal characteristics corresponding specifically to a reflection produced by a particular one of the one or more calibration reflection elements, so as to distinguish the reflection produced by the particular calibration reflection element from one or more reflections produced by a distinct calibration reflection element (e.g., another of the one or more calibration reflection elements) and/or a reflection produced by a reflection element. Further, in various embodiments, the transceiver signal processing circuitry 106 may be configured to execute one or more signal analysis processes to detect and/or calculate, from within a signal, one or more interference signals corresponding to a divergent reflection portion and/or an indirect reflections, refractions, deflections, and/or the like present within an elevator shaft. In such an exemplary circumstance, for example, the transceiver signal processing circuitry 106 may be configured to execute one or more signal analysis processes to analyze and/or calculate the one or more interference signals based at least in part on an electromagnetic equation. For example, in various embodiments, transceiver signal processing circuitry 106 may be configured to execute one or more signal analysis processes and/or data transformation operations so as to process at least a portion of the transceiver signal data into formatted data that may be further processed by the car position determination circuitry 104 of the controller 100, as described herein, to determine the distances between a transceiver and at least a portion of a plurality of positioning elements, such as, for example, a reflector element and at least one of one or more calibration reflector elements, at a given instance.

In various embodiments, the transceiver signal processing circuitry 106 may be configured to execute one or more of the operations described herein at two or more instances, so as to facilitate the receiving, processing, generating, and/or transmitting of transceiver signal data at various instances (e.g., runtimes) over time. In various embodiments, the transceiver signal processing circuitry 106 may be configured to store at least a portion of the resultant data corresponding to one or more of the operations described herein as historical system data that, for example, may be associated with one or more instances (e.g., an installation instance, a particular runtime). In such an exemplary circumstance, the transceiver signal processing circuitry 106 may be configured to access at least a portion of the historical system data (e.g., via the memory 101) in order to facilitate the execution of one or more operations described herein.

In various embodiments, the processor 102 may be configured to communicate with the car position determination circuitry 104. The car position determination circuitry 104 may be a device or circuitry embodied in either hardware or a combination of hardware and software that is configured to execute a car position detection operation of an exemplary elevator positioning system, as described herein. In various embodiments, the car position determination circuitry 104 may be configured to determine the position of an elevator car within an elevator shaft at a particular instance, as described herein, by determining the distances between a transceiver and at least a portion of a plurality of positioning elements, such as, for example, a reflector element and at least one of one or more calibration reflector elements, at the particular instance. As described herein, the car position determination circuitry 104 may be configured to accurately determine the position of the elevator car within an elevator shaft by compensating for a variance in one or more elevator shaft conditions, such as, for example, the overall shaft height and/or the height of localized shaft portions defined along a portion of the shaft height.

For example, in various embodiments, the car position determination circuitry 104 may be configured to determine an adjusted elevator car position, as described herein, based at least in part on a defined relationship between an initial calibration element distance, a runtime calibration element distance, and a runtime reflector element distance. As a non-limiting example described in further detail herein, the car position determination circuitry 104 may be configured to determine, based at least in part on processed transceiver signal data received from the transceiver signal processing circuitry 106 and corresponding to a reflection received at an installation instance, a distance between a transceiver and a first calibration reflector element at the installation instance, which may define the initial calibration element distance. Alternatively, and/or additionally, the car position determination circuitry 104 may be configured to retrieve various historical system configuration data stored in the memory 101, including stored data corresponding to an installation instance, such as, for example, the initial calibration element distance. Further, the car position determination circuitry 104 may be configured to determine, based at least in part on processed transceiver signal data received from the transceiver signal processing circuitry 106 and corresponding to a reflection received at a runtime instance, a distance between a transceiver and the first calibration reflector element at the runtime instance, which may define the runtime calibration element distance. The car position determination circuitry 104 may be further configured to determine, based at least in part on processed transceiver signal data received from the transceiver signal processing circuitry 106 and corresponding to a reflection received at the runtime instance, a distance between a transceiver and a reflector element at the runtime instance, which may define the runtime reflector element distance.

Based at least in part on the initial calibration element distance, the runtime calibration element distance, and the runtime reflector element distance, the car position determination circuitry 104 may be configured to determine an adjusted elevator car position, which may define a vertical position (e.g., along a height of the elevator shaft) in which the elevator car is to be positioned so as to compensate for the expansion and/or compression of the elevator shaft (e.g., one or more vertical shaft portions thereof) in the vertical direction, such that the elevator car may be positioned within a horizontal plane that is at least substantially aligned with a desired position relative to an external environment, such as, for example, an intermediate building floor. As described herein, the car position determination circuitry 104 may be configured to determine an adjusted elevator car position at a runtime instance using the following equation, wherein h' represents the adjusted elevator car position, h represents the runtime reflector element distance, d represents the initial calibration element distance, and d' represents the runtime calibration element distance:

$$h' = h + \frac{h * (d' - d)}{d}$$

Further, in an exemplary embodiment wherein the plurality of positioning elements of an exemplary elevator positioning system 1 comprises a reflector element and a plurality of calibration reflector elements, as described herein in reference to FIG. 2C, the car position determination circuitry 106 may be configured to determine, based at least in part on processed transceiver signal data received from the transceiver signal processing circuitry 106 and corresponding to a plurality of reflections received at an installation instance, a plurality of distances between a transceiver and each of the plurality of calibration reflector elements, respectively, at the installation instance. Alternatively, and/or additionally, the car position determination circuitry 104 may be configured to retrieve various historical system configuration data stored in the memory 101, including stored data corresponding to an installation instance, such as, for example, the aforementioned plurality of initial calibration element distances. In such an exemplary circumstance, the car position determination circuitry 104 may be configured to identify which calibration reflector element of the plurality of calibration reflector elements to use in a determination of the adjusted elevator car position, as described above, based at least in part on a runtime range of motion of the elevator car and/or a relative vertical proximity (e.g., as measured along the height of the elevator shaft) of a calibration reflection element to a horizontal plane that is at least substantially aligned with a desired position relative to an external environment, such as, for example, an intermediate building floor.

Further, the car position determination circuitry 104 may be configured to determine, based at least in part on processed transceiver signal data received from the transceiver signal processing circuitry 106 and corresponding to at least one of a plurality of reflections received at a runtime instance, a distance between a transceiver and at least one calibration reflector element of the plurality of calibration reflection elements, at the runtime instance, which may define the runtime calibration element distance. In an exemplary circumstance, the car position determination circuitry 104 may be configured to determine, based at least in part on processed transceiver signal data received from the transceiver signal processing circuitry 106 and corresponding to at least a portion of a plurality of reflections received at a runtime instance, a plurality of distances between a transceiver and at least a portion of the plurality of calibration reflector elements, respectively, at the runtime instance, which may define a plurality of runtime calibration element distances associated, respectively, with the at least a portion of the plurality of calibration reflector elements. In various embodiments, the car position determination circuitry 104 may be configured to determine a linear relationship to characterize an amount (e.g., magnitude) of vertical displacement (e.g., expansion and/or compression) realized at a vertical portion of the elevator shaft sidewall extending between two or more of the plurality of calibration reflector elements. For example, the car position determination circuitry 104 may characterize the amount of vertical displacement realized at the vertical portion of the elevator shaft sidewall extending between a first calibration reflector element and a second calibration reflector element as a linear relationship defined by the linear equation form y=mx+b, based at least in part on a first runtime calibration element distance and a second runtime calibration element distance. As described herein, in various embodiments, the car position determination circuitry 104 may be configured to determine the amount of vertical displacement realized at one or more vertical portions of the elevator shaft sidewall by executing one or more interpolation operations based at least in part on one or more runtime calibration element distances and a runtime reflector element distance.

In various embodiments, wherein the plurality of positioning elements of an exemplary elevator positioning system comprises a switch positioning element, as described herein in reference to FIG. 2D, the car position determination circuitry 104 may be configured to receive and/or retrieve a trigger signal and/or elevator car position data from an exemplary switch positioning element. As described herein, in various embodiments, the elevator car position data received by the car position determination circuitry 104 may comprise, for example, data indicative of a vertical position of an elevator car at a trigger instance (e.g., a time at which the position switch element is triggered by the elevator car) and/or one or more system configuration instructions configured to cause the car position determination circuitry 104 to execute a car position detection operation, as described herein. For example, in various embodiments, the car position determination circuitry 104 may be configured to determine an adjusted elevator car position, as described herein, based at least in part on a defined relationship between an initial calibration distance, a runtime trigger distance, and a runtime reflector distance. In such an exemplary circumstance, as described herein, the car position determination circuitry 104 may be configured to determine an adjusted elevator car position at a runtime instance using the following equation, wherein h' represents the adjusted elevator car position, h represents the runtime reflector distance, t represents the initial calibration distance, and t' represents the runtime trigger distance:

$$h' = h + \frac{h*(t'-t)}{d}$$

In various embodiments, the car position determination circuitry 104 may be configured to execute one or more of the operations described herein at two or more instances, so as to facilitate the determination of various adjusted elevator car position various instances (e.g., runtimes) over time. In various embodiments, the car position determination circuitry 104 may be configured to store at least a portion of the resultant data corresponding to one or more of the operations described herein as historical system data that, for example, may be associated with one or more instances (e.g., an installation instance, a particular runtime). In such an exemplary circumstance, the car position determination circuitry 104 may be configured to access at least a portion of the historical system data (e.g., via the memory 101) in order to facilitate the execution of one or more operations described herein.

In various embodiments, as described herein, an exemplary elevator positioning system may comprise a reflector element disposed within an elevator shaft relative to a transceiver such that the reflector element may reflect at least a portion of a signal emitted from the transceiver in a predetermined direction towards the transceiver. For example, in various embodiments, an exemplary reflection element may comprise a plane reflector defined at least in part by a reflector plate such that a signal emitted from a transceiver may be received by the reflection element at the reflector plate (e.g., at the reflecting face of the reflector plate) and redirected in an at least substantially different direction away from the reflector plate and towards the transceiver.

For example, as described herein, an exemplary elevator positioning system may comprise a transceiver disposed within an elevator shaft and a reflector element positioned along an emission path defined by a signal emitted from a transceiver 30 such that a reflector plate (e.g., at a reflecting face) of the reflector element may be engaged by at least a portion of the emitted signal. For example, in various embodiments, a transceiver and a reflector element disposed within the elevator shaft may be aligned with one another along a linear axis extending directly therebetween, for example, in an at least substantially vertical direction. In various embodiments, a reflector element 40 and the transceiver 30 may be configured to face one another such that at least a portion of the high frequency waves generated by the transceiver and emitted from a transmission face thereof may travel directly to a reflector plate of the reflector element (e.g., along the linear axis extending therebetween) without engaging another surface and/or component disposed within the elevator shaft prior to reaching the reflector element.

In various embodiments, an exemplary elevator positioning system may comprise a reflector element configured reduce various inaccuracies, interferences, and/or obscurities associated with various conditions within an exemplary elevator shaft. For example, in various embodiments, the signal strength of a reflection detected by a transceiver may be optimized by maintaining an aligned configuration between the reflecting face of the exemplary reflector element and the transceiver. In an exemplary configuration wherein a reflector element is tilted at an angle away from a transceiver disposed a distance away therefrom, such that the reflecting face of the reflector element does not directly face the emitting face of the transceiver, the signal strength of a reflection detected by the transceiver from the tilted reflection element may be weaker than that of a reflection from a reflection element directly aligned with the transceiver. Accordingly, an exemplary reflector element described herein may be configured to reduce various inaccuracies, interferences, and/or obscurities associated with the reflector element being mounted to a tilted mounting surface (e.g., a top shaft surface 11, a bottom shaft surface 12) such that the reflector element defines a tilted angular configuration relative to the transceiver.

Figure 4B:
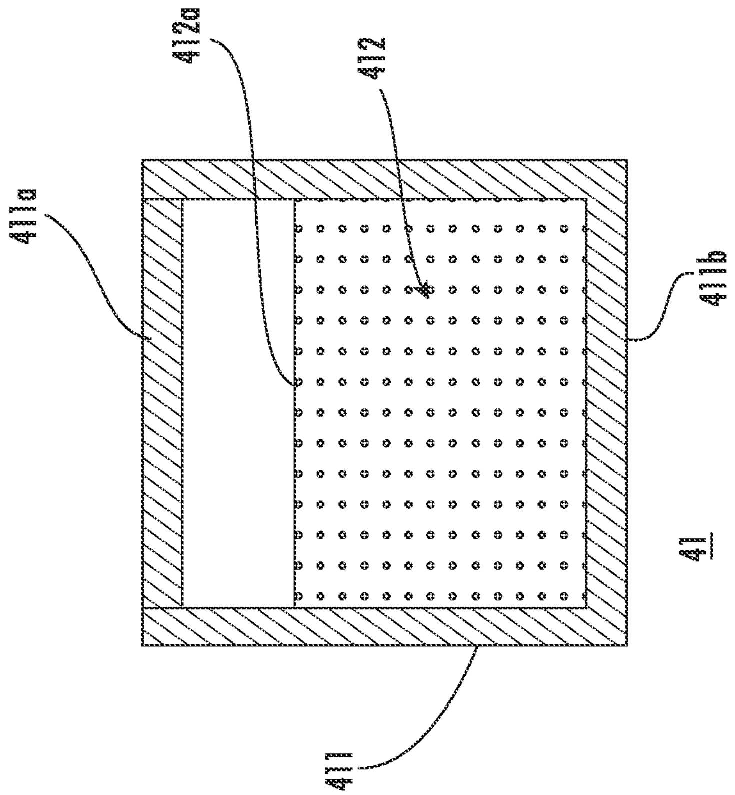
FIGS. 4A-4B illustrate various exemplary positioning elements of an exemplary system according to various embodiments described herein.
Figure 4A:
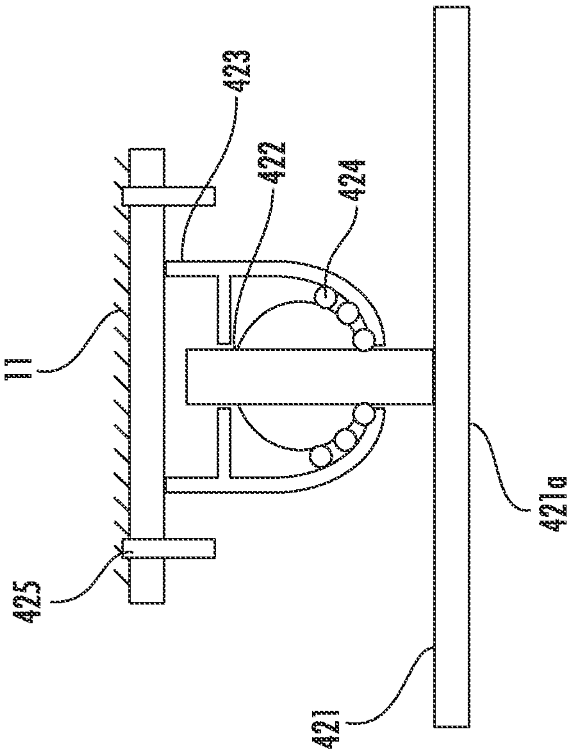

As non-limiting examples, FIGS. 4A and 4B illustrate exemplary reflector elements according to various embodiments described herein. In particular, FIGS. 4A and 4B illustrate exemplary reflector elements configured to maintain an at least substantially horizontal configuration wherein a reflecting face thereof remains within a substantially horizontal plane (e.g., aligned directly with an emitting face of a transceiver) independent of the configuration of the surface to which the reflector element is secured. For example, an exemplary reflector element may comprise an at least partially dynamic configuration wherein the angular configuration of the reflecting face of an exemplary reflector element may be independent of the angular configuration of the surface to which the reflector element is secured. In such an exemplary circumstance, a relative angular configuration between the reflecting face and the surface to which the reflector element is secured may vary as the angular configuration of the surface shifts away from an at least substantially horizontal plane.

As a non-limiting example, the exemplary reflector element 42 illustrated in FIG. 4A comprises a reflector plate 421, defining a reflecting face 421*a*, as described herein, and a reflector element base 423 configured to be fixedly secured to an at least substantially planar and downward-facing surface 11, such as, for example, a top shaft surface, as described herein, via one or more attachment means 425. In various embodiments, as illustrated in FIG. 4A, an exemplary reflector element 42 may embody a gravity hammer defined at least in part by a dynamic configuration, as described herein. In various embodiments, attachment means 425 may be configured to prevent the reflector element base 423 from moving relative to the surface 11 to which it is secured. In various embodiments, the reflector element 42 may further comprise reflector plate stem 422 configured to couple the reflector element base 423 to the reflector plate 421. In various embodiments, the reflector plate stem 422 may be fixedly secured to the reflector plate 421 (e.g., at a back plate surface) and further configured to facilitate at least a portion of the dynamic configuration of the exemplary reflector element 42. For example, as illustrated, the reflector stem may be rotatably secured to the reflector element 423 such that the reflector plate stem 422, and thus, the reflector plate 421 fixedly secured thereto, may define an angular range of motion about a perpendicular axis of the planar surface of to which the reflector element base 423 is attached. As illustrated, a reflector element 42 may comprise a plurality of ball bearings 424 disposed between a portion of the stationary reflector element base 423 and the dynamic reflector plate stem 422 to facilitate the movement of the reflector plate stem 422 relative to the reflector element base 423, for example, in an angular direction about the perpendicular axis defined by surface 11. In various embodiments, the reflector plate 421 of an exemplary reflector element 42 may be configured in an at least partially suspended configuration (e.g., cantilevered at the interface between the reflector plate stem 422 and the reflector element base 423) such that one or more gravitational forces acting on reflector plate 421 may stabilize the reflecting face 421*a* in an at least substantially horizontal configuration perpendicular to the vertical direction. Further, in an exemplary circumstance wherein the surface 11 to which the reflector element 42 is secured—and thus, the reflector element base 423—does not define a horizontal configuration, the dynamic configuration of the reflector element 42 may enable the one or more gravitational forces acting on the reflector element 42 to cause the reflector plate stem 422 to move relative to the reflector element base 423, such that the reflector plate 421, and thus, the reflecting face 421*a* may remain in an at least substantially horizontal configuration perpendicular to the vertical direction. In such an exemplary circumstance, the reflecting face 421*a* of the reflector element 42 may maintain an aligned configuration relative to an emitting face of a transceiver, as described herein, independent of the relative angular configuration of the surface to which the reflector element 42 is secured.

As a further non-limiting example, in various embodiments, an exemplary reflector element may be configured such that the reflecting face thereof is defined as a top surface of a volume of liquid disposed within a liquid housing. For example, as illustrated in FIG. 4B, an exemplary reflector element 41 may comprise a liquid tank 411 configured to house a volume of reflecting liquid 412 therein. As illustrated, a liquid tank 411 may comprise a top tank wall 411*a* and a bottom tank wall 411*b*, with a tank sidewall extending therebetween, which, collectively define a tank internal chamber in which a volume of reflecting liquid 412 may be housed. In various embodiments, the liquid tank 411 may be configured such that the tank internal chamber is fluidly isolated from an ambient environment in which the reflector element 41 may be positioned. For example, at least a portion of the liquid tank 411 may comprise a sealed interface to prevent fluid transfer and/or evaporation within the liquid tank 411. In various embodiments, the bottom tank surface 411*b* of exemplary reflector element 42 may be configured to be fixedly secured to an at least substantially planar and upward-facing surface, such as, for example, a bottom shaft surface, as described herein, via one or more attachment means. As described herein, the attachment means may be configured to prevent the bottom tank surface 411*b* from moving relative to the surface to which the reflector element 42 is secured.

In such an exemplary configuration, top tank wall 411 may face an at least substantially upward vertical direction away from the surface to which the reflector element 41 (e.g., via the bottom tank surface 411*b*) is fixedly secured. In various embodiments, at least a portion of the liquid tank 411 may comprise one or more materials configured to allow at least a portion of a signal emitted from a transceiver, as described herein, to pass therethrough, such as, for example, a plastic material. Further, in various embodiments, at least a portion of the liquid tank 411 may comprise one or more materials configured to prevent the emitted signal from passing therethrough, such as, for example, an anti-reflective material and/or coating. For example, in various embodiments, a top tank wall 411 may comprise a plastic material configured to allow at least a portion of the emitted signal from the transceiver to pass therethrough, such that the at least a portion of the emitted signal may engage a volume of reflecting liquid 412 (e.g., a reflecting face 412*a*) disposed within the liquid tank 411. Further, in various embodiments, a tank sidewall and/or a tank bottom wall 411 may be defined in part by an anti-reflective material such that the reflector element 41 may only produce reflections from the reflecting face 412*a* of the reflecting liquid 412 and/or the top tank wall 411, as described herein.

As illustrated, a reflecting face 412*a* of a volume of reflecting liquid 412 disposed within the liquid tank 411 may similarly face an at least substantially upward vertical direction away from the surface to which the reflector element 41 (e.g., via the bottom tank surface 411*b*) is fixedly secured. In various embodiments, the reflecting liquid 412 housed within the liquid tank 411 may comprise one or more anti-freezing chemicals, such as, for example, glycol, in order to avoid a freezing condition such that operability may be maintained at extreme cold temperatures. Further, as illustrated, the volume of reflecting liquid 412 may occupy at least a portion of the internal volume of the liquid tank 411. In an exemplary circumstance wherein the reflecting liquid 412 occupies less than the entirety of the internal volume of the liquid tank 411, the remainder of the tank may be occupied with one or more additional fluids, such as, for example, air. Further, in various embodiments, at least a portion of the liquid tank 411 may be coated with one or more condensation-preventing chemicals in order to alleviate condensation of the volume of reflection liquid 412 disposed therein.

As described herein, the reflector element 41 may be arranged relative to a transceiver such that the reflecting face 412*a* of the volume of reflecting liquid 412 may receive and reflect at least a portion of a signal emitted from a transceiver back towards the transceiver. For example, the dynamic configuration of the reflector element 41, as described herein, may be defined at least in part by the volume of liquid 412 disposed within the liquid tank 411. For example, one or more gravitational forces acting on the volume of reflecting liquid 412 may stabilize the reflecting face 412*a* in an at least substantially horizontal configuration perpendicular to a vertical direction. As such, in an exemplary circumstance wherein the surface to which the reflector element 41 is secured—and thus, the liquid tank 411—does not define a horizontal configuration, the dynamic configuration of the reflecting liquid 412 within the reflector element 41 may enable the one or more gravitational forces acting on the reflector element 42 to cause the reflecting face 412*a* of the reflecting liquid 412 to remain in an at least substantially horizontal configuration perpendicular to the vertical direction. In such an exemplary circumstance, the reflecting face 412*a* of the reflector element 41 may maintain an aligned configuration relative to an emitting face of a transceiver, as described herein, independent of the relative angular configuration of the surface to which the reflector element 41 is secured and/or the relative angular configuration of the liquid tank 411 within which the reflecting liquid 412 is housed.

In various embodiments, the portion of the emitted signal reflected by the volume of reflecting liquid 412 may be received and reflected by reflecting face 412*a* after first passing through top tank wall 411*a*. In such an exemplary circumstance, the emitted signal received by the exemplary reflector element 42 may be reflected back to the transceiver as one or more reflections comprising a housing reflection reflected from the reflector element 42 by the liquid tank 411 (e.g., the top tank wall 411) and a liquid reflection reflected from the reflector element 42 by the volume of reflecting liquid 412 (e.g., a reflecting face 412*a*). In various embodiments wherein the transceiver detects both a housing reflection and a liquid reflection from an exemplary reflection element 41, a controller 100 may process transceiver signal data comprising both the housing reflection and the liquid reflection. For example, the controller 100 may be configured to identify both the housing reflection and the liquid reflection based at least in part on one or more known material characteristics, such as, for example, a radar reflection coefficient of the reflecting liquid 412 and/or the top tank wall 411. An exemplary controller 100 may be configured to execute one or more data processing operations, such as, for example, an extreme point searching operation, to determine one or more characteristics of the exemplary reflector element 41, such as, for example, a distance between the top tank wall 411*a* and the reflecting face 412*a*, a distance between the transceiver and the exemplary reflector element 41, and/or the like.

Further, in various embodiments, an exemplary reflector element may be installed within an elevator shaft such that at least a portion of the reflector element may define a tilted angular configuration relative to a transceiver. As a non-limiting example, an exemplary reflector element 41 may be fixedly secured to a tilted surface having a known tilt angle relative to the transceiver, such that the angular misalignment between at least a portion of the reflector element 41 and the transceiver may comprise a known value. As described herein, in various embodiments, the reflector element 41 may be configured such that reflecting face 412*a* is maintained in an aligned configuration relative to the emitting face of the transceiver independent of the tilted configuration of the surface to which the reflector element is secured and/or the corresponding angular configuration of the liquid tank 411. Accordingly, in such an exemplary configuration, the signal strength of a reflection detected by the transceiver from the reflecting face 412*a* of the reflection element 41 (e.g., a liquid reflection) may be at least substantially stronger than that of a reflection from the liquid tank 411 (e.g., a housing reflection), based at least in part on the misaligned configuration of the liquid tank 411 relative to the emitting face of the transceiver, as described herein. In such an exemplary circumstance, a controller may be configured to characterize the tilted configuration of the portion of the reflector tank 41 (e.g., the liquid tank 411) based at least in part on stored system data indicative of the known tilt angle value associated with the liquid tank 411. The controller may be configured to identify one or more reflections detected by the transceiver as a housing reflection received from a tilted surface of the liquid tank 41 based at least in part a relatively weak signal strength and/or stored system data indicative of the known tilt angle of the liquid tank 411, the material of at least a portion of the liquid tank 411, and/or the like.

Figure 5:
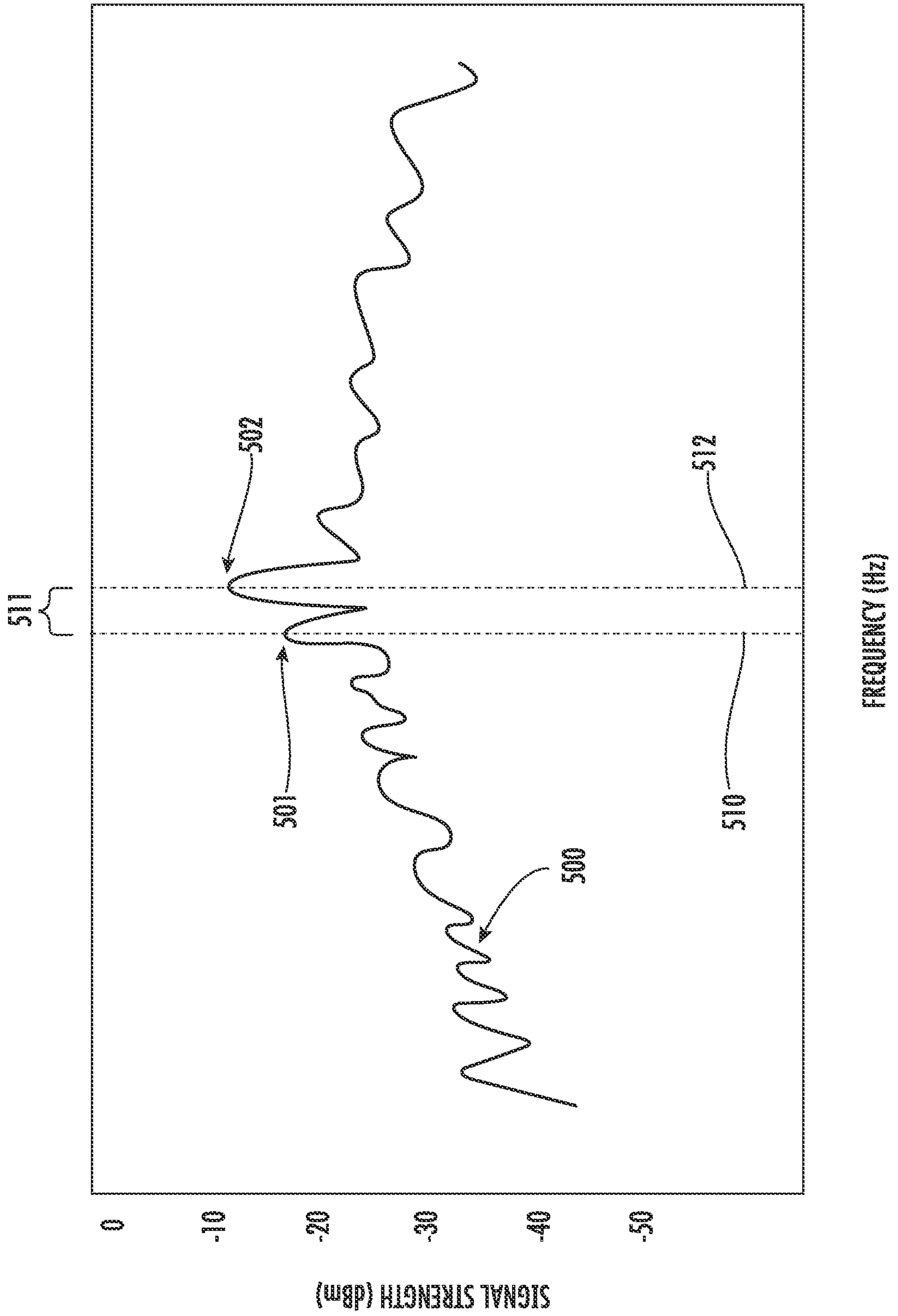
FIG. 5 shows an exemplary graphical representation of signals produced by a testing configuration in accordance with various embodiments.

Further, in various embodiments, a controller of an exemplary elevator positioning system may be configured to monitor one or more operational characteristics of an exemplary reflector element. For example, in an exemplary circumstance wherein an elevator positioning system comprises the exemplary reflector element 41 illustrated in FIG. 4B, a controller may be configured to monitor the health of the reflector element by monitoring the level of the reflecting liquid 412 within the liquid tank 411 in order to detect a loss of at least a portion of the reflecting liquid caused by evaporation. FIG. 5 shows a graphical representation of an exemplary transceiver signal data comprising a transceiver output signal 500 received by a controller. In an exemplary embodiment, signal 500 may correspond to one or more reflections detected by a transceiver from a reflection element 41, as illustrated in FIG. 4B. As described herein, based at least in part on illustrated signal 500, an exemplary controller may be configured to determine the distance between a top tank wall 411*a* and a reflecting face 412*a* of a volume of reflecting liquid 412 within a reflector element 41 at one or more instances over time.

In various embodiments, at least a portion of the transceiver signal data received by the controller 100 may be graphically represented in a frequency domain by output signal 500. As illustrated, at least a portion of the transceiver output signal 500 may correspond to a housing reflection reflected from the reflector element 42 by a liquid tank 411 (e.g., the top tank wall 411). In various embodiments, the portion of output signal 500 corresponding to the housing reflection received by the transceiver may be defined at least in part by the measured signal strength at a frequency 510 corresponding to the liquid tank 411 of the reflector element 41. As described herein, the frequency 510 corresponding to the housing reflection produced by the liquid tank 411 of the reflector element 41 may comprise a predetermined frequency value calculated based at least in part on the material of at least a portion of the liquid tank 411, and/or the like. Alternatively, and/or additionally, the frequency 510 corresponding to the housing reflection produced by the liquid tank 411 of the reflector element 41 may be determined based at least in part on one or more extreme point searching operations within a predetermined range.

Further, in various embodiments, at least a portion of the transceiver output signal 500 may correspond to a liquid reflection reflected from the reflector element 42 by the volume of reflecting liquid 412 (e.g., a reflecting face 412*a*). In various embodiments, the portion of output signal 500 corresponding to the liquid reflection received by the transceiver may be defined at least in part by the measured signal strength at a frequency corresponding to the volume of reflecting liquid 412 of the reflector element 41. In various embodiments, the frequency 512 at which the signal strength of a liquid reflection may be measured may comprise a predetermined frequency value determined based at least in part on the reflective coefficient of the reflecting liquid 412, the frequency of the signal emitted from the transceiver, and/or the like. Alternatively, and/or additionally, the frequency 512 corresponding to the liquid reflection produced by the reflecting liquid 412 of the reflector element 41 may be determined based at least in part on one or more extreme point searching operations.

As illustrated, the frequency 512 at which the signal strength of the liquid reflection is measured and the frequency 510 at which the signal strength of the housing reflection is measured may be separated in the frequency domain by a frequency separation 511. In various embodiments, the magnitude of the frequency separation 511 may be defined at least in part by the difference between the frequencies of the signals associated with the housing reflection and the liquid reflection, respectively. For example, the frequency separation 511 may be defined by the difference between the frequency 510 at which a peak housing reflection signal is measured 501 and the frequency 512 at which a peak liquid reflection signal 502 is measured. As described herein, the difference between the frequency 510 at which a peak housing reflection signal is measured and the frequency 512 at which a peak liquid reflection signal is measured may be defined at least in part by a distance between the top tank wall 411*a* and the reflecting face 412*a* of the reflecting liquid 412. In various embodiments, an exemplary controller may be configured to determine the operational status of a reflector element 41 (e.g., the reflecting liquid 412) by determining an initial frequency separation 511 value an installation instance and detecting a runtime frequency separation 511 at a runtime instance, as described herein, that varies from the initial frequency separation. For example, a controller may be configured to determine that such a variance in frequency separation 511 may be indicative that at least a portion of the reflecting liquid 412 within the liquid tank 411 at the installation instance has evaporated.

In various embodiments, as a signal emitted from the transceiver continues away from the transceiver at least generally toward the reflector element in an emission direction along the linear axis extending directly therebetween, at least a portion of the emitted signal may naturally diverge away from the emission direction such that the emitted signal may define a signal emission angle. In such an exemplary circumstance, the emitted signal may diverge so as to define a cone-shaped signal, wherein a cross-sectional area defined by the cone-shaped signal increases as it extends toward the reflector element (e.g., along the linear axis between the transceiver and the reflector element). In various embodiments, an emitted signal angle may correspond to an angle measured between an original signal emission direction of an emitted signal (e.g., along the linear axis between the transceiver and the reflector element) and an outermost portion of the signal relative to the linear axis.

In various embodiments, an emitted signal may comprise a first emitted signal portion emitted along an emission path directly from the transceiver to the reflector plate of the reflector element (e.g., along the linear axis therebetween) so as to define a signal emission angle of at least substantially zero degrees. Further, in such an exemplary circumstance, the emitted signal may further comprise a second emitted signal portion emitted at a signal emission angle of at least substantially greater than zero so as to define an emission path that does not extend directly from the transceiver to the reflector plate. For example, the second emitted signal portion may define a divergent portion of the emitted signal that, prior to engaging with the reflector plate of the reflector element, may first engage one or more surfaces and/or components disposed within the elevator shaft.

It should be understood that, in various embodiments, a reflection reflected from a reflector plate of a reflector element in a reflection direction (e.g., away from the reflector element along the linear axis extending directly between the reflector element and the transceiver) may comprise a cone-shaped configuration that is at least substantially similar to that of the exemplary emitted signal described above. For example, in such an exemplary circumstance, a reflection reflected from the reflector plate may diverge away from the reflection direction so as to define a cone-shaped reflection, wherein a cross-sectional area defined by the cone-shaped reflection increases as it extends toward the transceiver. In various embodiments, a reflection may comprise a first reflection portion that is reflected along a reflection path from the reflector plate of the reflector element directly to the transceiver (e.g., along the linear axis therebetween) so as to define a reflection angle of at least substantially zero degrees. Further, in such an exemplary circumstance, the reflection may further comprise a second reflection portion emitted at a reflection angle of at least substantially greater than zero so as to define a reflection path that does not extend directly from the reflector plate to the transceiver. For example, the second reflection portion may define a divergent portion of the reflection that, prior to being detected by the transceiver, may first engage one or more surfaces and/or components disposed within the elevator shaft.

In various embodiments, a second emitted signal portion and/or a second reflection portion that defines a divergent portion of an emitted signal and/or a reflection, respectively, as described above, may be reflected, refracted, and/or diffracted within an elevator shaft such that one or more interference signals are generated within the elevator shaft. For example, one or more interference signals within the elevator shaft may cause multi-path interference, for example, between the reflector, an elevator car door, a structural fixture within the elevator shaft, and/or the like, that may affect the performance of an elevator positioning system such that the transceiver may be unable to detect a first reflection portion (e.g., a reflection reflected directly to the transceiver from the reflector plate) and/or may detect a first reflection portion that is at least partially obstructed and/or distorted (e.g., defining an increased and/or decreased amplitude).

Figure 6B:
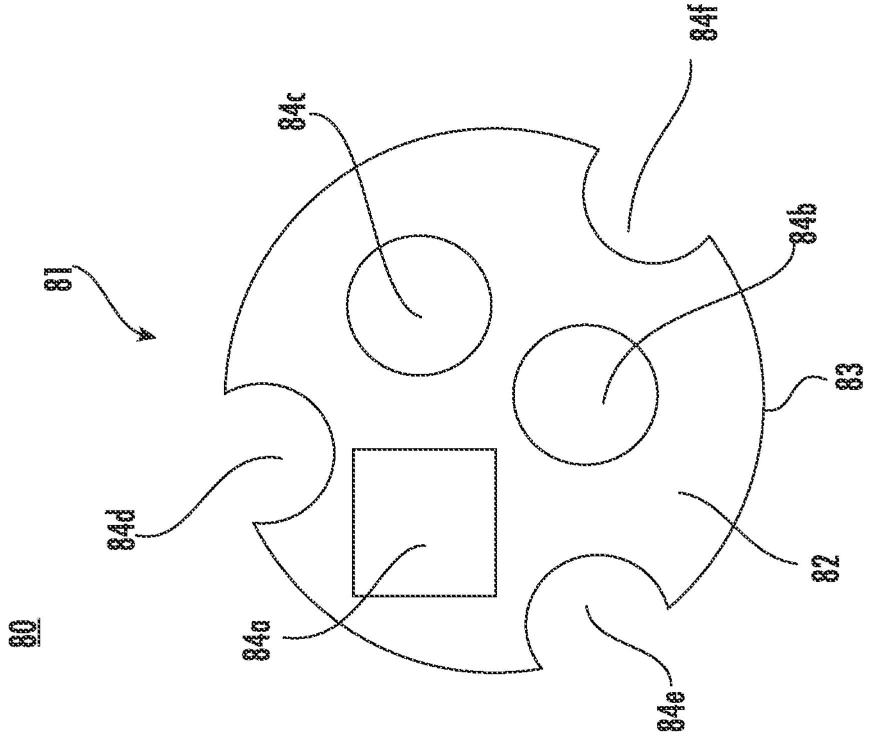
FIGS. 6A-6B various exemplary positioning elements of an exemplary system according to various embodiments described herein.
Figure 6A:
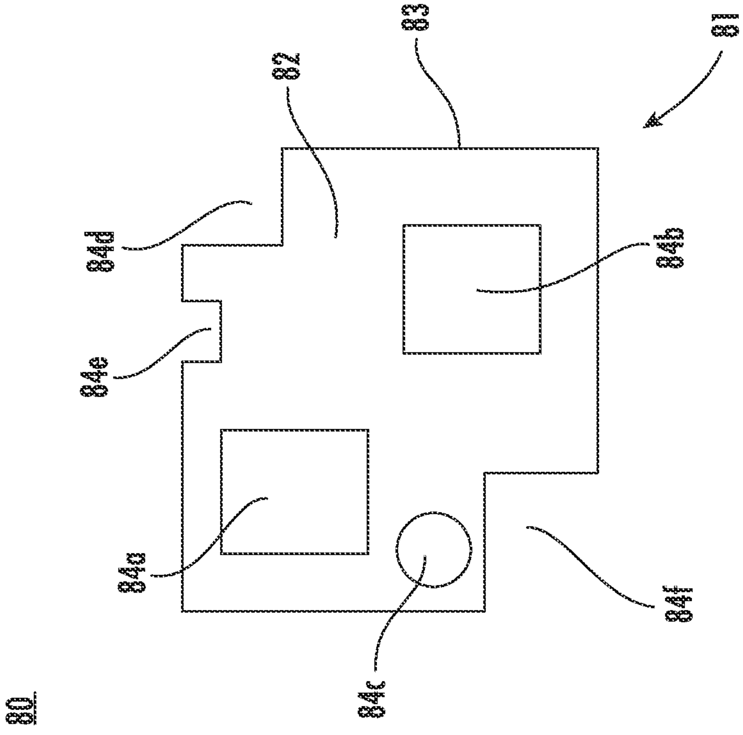

In various embodiments, an exemplary reflector element described herein may be configured to at least partially reduce interference within an elevator shaft caused by multi-path reflection. For example, in various embodiments, an exemplary reflector element may comprise a reflector plate configured to reduce an at least a portion of reflections reflected therefrom that may result in interference signals within the elevator shaft. FIGS. 6A-6B illustrate exemplary reflector elements in accordance with various embodiments described herein. In particular, FIGS. 6A-6B each illustrate a top-down view of a reflector plate 81 of an exemplary reflector element 80, wherein the reflector plate 81 comprises one or more apertures extending therethrough. In various embodiments, the exemplary reflector plate may comprise a substantially flat planar configuration. For example, a reflector plate 81 may comprise a reflecting face 82 at which the reflector plate 81 may be engaged by at least a portion of an emitted signal (e.g., a first signal portion) emitted from a transceiver. In various embodiments, the reflector plate 81 may comprise a thickness extending between a reflecting face 82 and a back plate surface. For example, a reflecting face 82 may define an at least substantially flat planar surface (e.g., extending in a horizontal direction. Alternatively, in various embodiments, the reflecting face 82 may comprise a curved configuration and/or a complex configuration defined at least in part by a variable height and or vertical position at one or more locations about the reflector plate 81. In various embodiments, a reflector plate 81 may comprise a rectangular profile, a rounded profile, and/or any other geometric profile configured to facilitate the operability of the reflector element 80. For example, the shape (e.g., the profile) of the reflector plate 81 may be defined at least in part by an outer plate perimeter 83 comprising an outermost edge extending around an outer boundary of the reflecting face 82.

As illustrated, in various embodiments, an exemplary reflector element 80 may comprise one or more orifices extending through a thickness of the reflector plate 81. As illustrated in FIGS. 6A-6B, in various embodiments, the one or more orifices extending through an exemplary reflector plate 81 may be distributed throughout the reflector plate 81 (e.g., about a reflecting face 82). For example, the one or more orifices extending through the exemplary reflector plate 81 may be configured such that at least a portion of an emitted signal emitted by a transceiver (e.g., a second emitted signal portion) may continue to travel through the one or more orifices in an emission direction away from the transceiver, such that the portion of the emitted signal received by the one or more orifices is not reflected by the reflector element 80 back towards the transceiver. Accordingly, as described herein, the one or more orifices arranged about the reflecting face 82 of an exemplary reflector element 80 may reduce at least a portion of the reflection reflected from the reflector plate 81 that may result in interference signals within the elevator shaft. For example, in various embodiments, one or more orifices may be arranged about the reflecting face 82 of a reflector plate 81 so as to disrupt the continuity of the signal reflected from the reflector plate in order to minimize the presence of interference signals having a signal phase opposite to that of the desired (e.g., directly reflected) reflection portion within the elevator shaft, thereby minimizing the distortion effect of multipath reflection, as described herein.

As a nonlimiting example, in various embodiments, the plurality of holes 84 (e.g., holes 84*a*, 84*b*, 84*c*, 84*d*, 84*e*, 84*f*) may comprise at least substantially between one and any number of holes that is operably feasible to include in the reflector element (e.g., between two and four holes) distributed throughout reflecting face 82. In various embodiments, one or more of the holes of the plurality of holes 84 may embody a physical configuration that is either the same as or different from a physical configuration of one or more of the other holes of the plurality 84. For example, the physical configuration of a hole as described herein may be defined at least in part by a surface area, a shape, an angular direction at which the hole extends through the thickness of the reflector plate 81 (e.g., relative to a central axis extending along the thickness of the reflector plate 81). In various embodiments, a surface area of a holes of the plurality 84 the may vary based at least in part on one or more dimensions of the reflector element 80 (e.g., a reflector plate 81 surface area) and/or a shaft height of at least a portion of an elevator shaft in which the reflector element may be disposed. As a nonlimiting example, in various embodiments, the cumulative surface area of each of the plurality of holes 84 distributed about the reflector plate 81 may comprise at least substantially between 10% and 75% (e.g., between 20% and 50%) of the total surface area of the reflecting face 82.

In various embodiments, at least a portion of the one or more orifices 84 may be arranged about the reflecting face 82 of the reflector plate 81 define an at least substantially symmetrical distribution relative to one or axis, planes, and/or the like. Further, in various embodiments wherein the one or more orifices 84 comprises a plurality of orifices, the plurality of orifices may be distributed at least substantially evenly about the reflecting face 82 of the reflector plate 81. Alternatively, or additionally, in various embodiments wherein the one or more orifices 84 comprises a plurality of orifices, the plurality of orifices may be distributed at least substantially randomly about the reflecting face 82 of the reflector plate 81. In various embodiments, one or more orifice may be arranged about an outer perimeter 83 of the receiving plate 81 such that at least a portion of the outer perimeter 83 of the reflector plate 81 is defined by at least one of the one or more orifices. In such an exemplary circumstance, an outer perimeter 83 of the receiving plate 81 may comprise at least one edge, corner, discrete directional transitions, discontinuous radii, and/or the like defined at least in part by the one or more one or more orifice arranged about the outer perimeter 83. Further, as illustrated, in various embodiments wherein the one or more orifices 84 comprises a plurality of orifices, one or more of the plurality of orifices 84*d*, 84*e*, 84*f* may be arranged about the outer perimeter 83 of the receiving plate 81 and, alternatively or additionally, one or more of the plurality of orifices 84*a*, 84*b*, 84*c* may be arranged about an inner portion of the reflector plate 81 so as not to intersect a portion of the outer perimeter 83 of the receiving plate 81.

Experimental testing was conducted to verify the effectiveness of embodiments as described herein. Data was collected over the course of multiple trials using various combinations of embodiments described above.

In the testing configuration, an exemplary elevator positioning system for testing was configured to be in electronic communication with various testing circuitries. A power signal and a drive signal were transmitted to a transceiver positioned in an exemplary testing arrangement facing a reflector element, as described herein. The testing circuitry comprised a drive circuit configured to transmit a signal to the transceiver. The testing circuitry was further electronically connected to an oscilloscope configured to receive transceiver signal data, such as, for example, an output signal corresponding to a reflection detected by the transceiver, and graphically display the transceiver signal data sensed by the transceiver. Example output signals 710, 720 corresponding to reflections detected by the transceiver from various testing reflector elements in the exemplary testing configuration are shown in FIG. 7.

Figure 7:
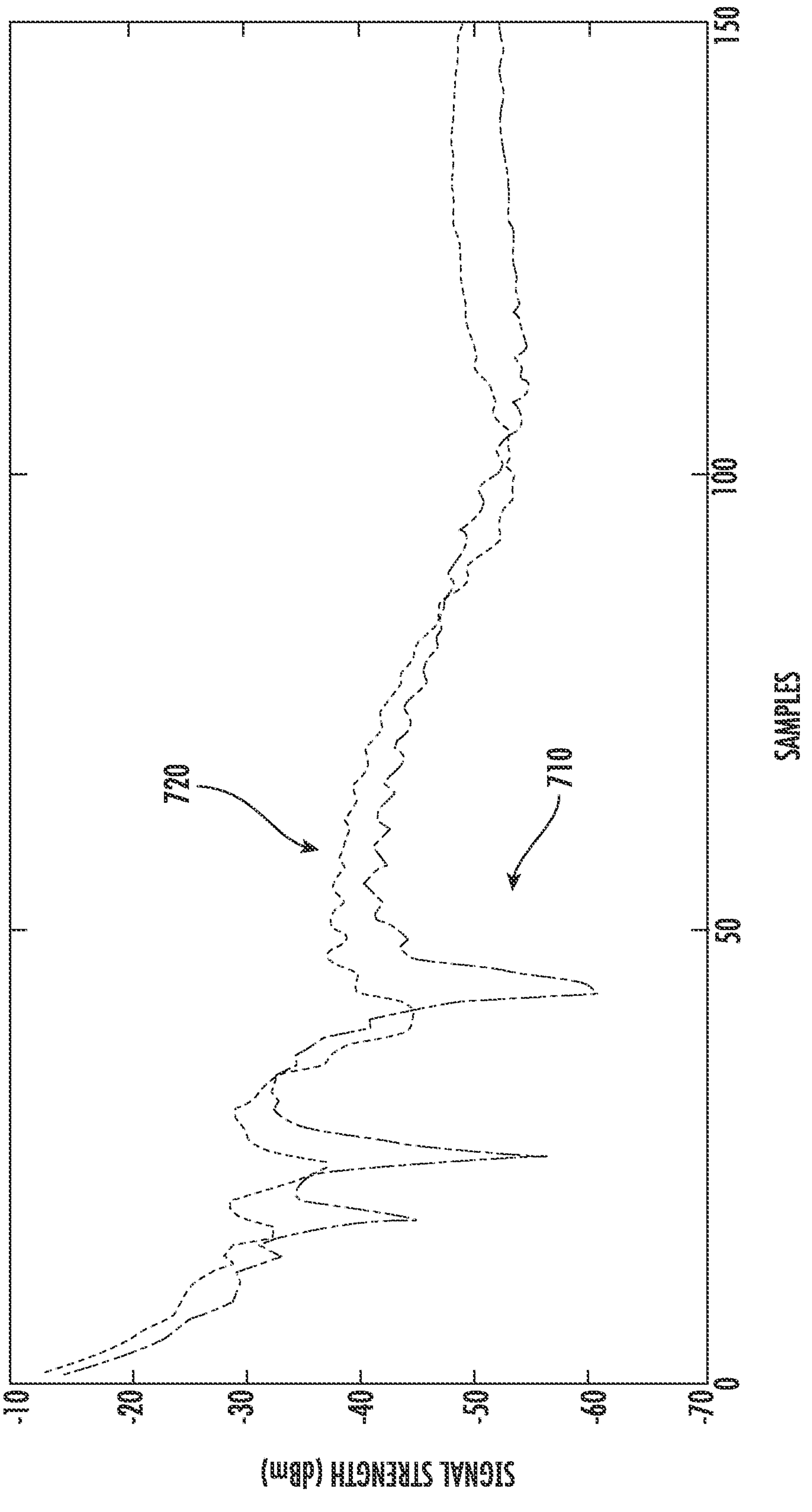
FIG. 7 shows an exemplary graphical representation of signals produced by a testing configuration in accordance with various embodiments.

FIG. 7 shows a graphical representation of two example output signals 710, 720, each corresponding to respective reflection sensed by a transceiver in an exemplary testing configuration, as described herein. As shown, a first output signal 710 corresponds to a reflection sensed by a transceiver in an exemplary testing configuration wherein a signal emitted from the transceiver is reflected back to the transceiver using a reflector element comprising a reflector plate with a baseline geometry that does not have any orifices arranged about either the interior area or the outer perimeter of the reflecting face, as described herein. Specifically, the reflecting face of the exemplary reflector element that produced the reflection corresponding to the first output signal 710 comprised a 600 mm×600 mm square surface without any orifices, as described herein. By comparison, the reflecting face of the exemplary reflector element that produced the reflection corresponding to the second output signal 720 embodied a 600 mm×600 mm square surface with two 100 mm×100 mm square orifices positioned about the outer perimeter of the reflector plate opposite corners thereof.

As shown, the first output signal 710 corresponding to a reflection detected from a reflector element comprising a square-shaped reflector plate comprises a distorted signal affected by interference within the exemplary testing environment due, in part, to multipath reflection, as described herein. For example, at least a portion of the first output signal 710 may be distorted in that the variance in signal amplitude between a baseline instance and a runtime instance may be reduced such that the strength of the signal at the runtime instance may at least partially indistinguishable from that of one or more baseline instances. Such a distorted output signal 710, may cause difficulties for an exemplary controller in determining a signal peak point at one or more runtime instances, such as, for example, when executing one or more extreme point searching operations. As a further non-limiting example, in various embodiments, a distorted signal caused by multipath reflection may be defined at least in part by a weakened signal strength at one or more frequencies caused by one or more interference signals having a signal phase that is substantially opposite from that of the distorted signal (e.g., the reflection reflected directly from the reflector element to the transceiver).

By contrast, a second output signal 720 corresponding to a reflection detected from a reflector element comprising reflector plate with one or more orifices defined about the reflecting face, comprises a signal having a more defined signal peak point. Such an output signal corresponding to a reflection produced by an exemplary reflector element comprising a reflector plate with one or more orifices may facilitate a more accurate signal peak point determination by a controller, for example, by simplifying the extreme point searching operations. In various embodiments, the increased accuracy of the signal peak point determination enabled by the exemplary reflector element comprising a reflector plate with one or more orifices may correspond to a more accurate determination of the distance between a transceiver and the exemplary reflector element, and thus, a more accurate determination of the vertical position of an exemplary elevator car within an elevator shaft, as described herein.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An elevator positioning system, comprising:
- a transceiver disposed within an elevator shaft, wherein the transceiver emits one or more signals;
- a first positioning element comprising a first reflector element, wherein the first positioning element is mounted on an elevator car within the elevator shaft, wherein the first positioning element is configured to receive and reflect a first signal of the one or more signals emitted from the transceiver;
- a second positioning element comprising a second reflector element, wherein the second positioning element is fixed to a sidewall of the elevator shaft, wherein a reflector plate is configured to receive and reflect a second signal of the one or more signals emitted from the transceiver; and
- a controller communicably coupled to the transceiver, wherein the controller is configured to:
  - determine a first distance between the transceiver and the first positioning element based at least in part on a first reflection of the first signal of the one or more signals detected by the transceiver from the first positioning element at a first instance;
  - determine a second distance between the transceiver and the second positioning element based at least in part on a second reflection of the second signal of the one or more signals detected by the transceiver from the second positioning element at the first instance;
  - calculate an adjusted elevator car position defined at least in part by a shaft displacement compensation distance, wherein the adjusted elevator car position is based at least in part on the first distance and the second distance, wherein the shaft displacement compensation distance is based at least in part on an initial distance between the transceiver and the second positioning element at an initial installation instance; and
  - adjust the elevator car to move about a vertical axis of the elevator shaft to a vertical position within the elevator shaft that corresponds at least in part to the adjusted elevator car position.

2. The elevator positioning system of claim 1, wherein the second positioning element comprises a structural frame element disposed within the elevator shaft.

3. The elevator positioning system of claim 1, further comprising a third positioning element arranged within the elevator shaft such that a third signal emitted from the transceiver engages the third positioning element; and wherein the third positioning element is positioned at a distance away from the second positioning element in a vertical direction.

4. The elevator positioning system of claim 1, wherein the first positioning element comprises the reflector plate defined at least in part by one or more orifices extending through a reflecting face such that at least a portion of the first signal emitted from the transceiver passes through the one or more orifices.

5. A method for controlling an elevator positioning system comprising:
- determining a first distance between a transceiver and a first positioning element based at least in part on a first reflection of a first signal of one or more signals detected by the transceiver from the first positioning element at a first instance, wherein the first positioning element is mounted on an elevator car within an elevator shaft, wherein the transceiver is disposed with the elevator shaft;
- determining a second distance between the transceiver and a second positioning element based at least in part on a second reflection detected of a second signal of the one or more signals detected by the transceiver from the second positioning element at the first instance, wherein the second positioning element is fixed to a sidewall of the elevator shaft;
- calculating an adjusted elevator car position defined at least in part by a shaft displacement compensation distance, wherein the adjusted elevator car position is based at least in part on the first distance and the second distance, wherein the shaft displacement compensation distance is based at least in part on an initial distance between the transceiver and the second positioning element at an initial installation instance; and
- adjusting the elevator car to move about a vertical axis of the elevator shaft to a vertical position within the elevator shaft that corresponds at least in part to the adjusted elevator car position.

6. An elevator positioning system, comprising:
- a transceiver disposed within an elevator shaft, wherein the transceiver emits one or more signals;
- a reflector element mounted to a mounting surface within the elevator shaft such that a first signal of the one or more signals emitted from the transceiver engages the reflector element at a reflecting plate, wherein the reflector element is arranged relative to the transceiver such that a first distance between the reflector element and the transceiver varies as an elevator car moves along a vertical axis within the elevator shaft, wherein the reflector element comprises a reflector stem secured to the reflecting plate, wherein the reflector stem is configured to facilitate an at least partially dynamic configuration such that the reflecting plate maintains at least substantially horizontal configuration independent of an angular configuration of the mounting surface.

7. An elevator positioning system, comprising:
- a transceiver disposed within an elevator shaft;
- a reflector element arranged within the elevator shaft such that a signal emitted from the transceiver engages the reflector element at a reflecting face, wherein the reflecting face comprises one or more orifices extending therethrough;

wherein the reflecting face is configured to reflect a first signal portion of the signal, and wherein the one or more orifices extending through the reflecting face is configured to receive a second signal portion of the signal such that the second signal portion passes through the one or more orifices.

8. The elevator positioning system of claim 7, wherein the one or more orifices comprises a plurality of orifices.

9. The elevator positioning system of claim 8, wherein at least a first portion of the plurality of orifices are disposed about an outer perimeter of the reflecting face; and wherein at least a second portion of the plurality of orifices are disposed about an inner portion of the reflecting face.

* * * * *